(12) United States Patent
Zhang

(10) Patent No.: US 7,203,004 B2
(45) Date of Patent: Apr. 10, 2007

(54) DIRECTED REFLECTION LIGHT COLLECTING DEVICE WITH PLANAR REFLECTORS

(75) Inventor: Yaoming Zhang, No. 30 Andeli West Yuhua Road, Jiangsu Province, Nanjing, 210012 (CN)

(73) Assignee: Yaoming Zhang, Nanjing (CN)

( * ) Notice: Subject to any disclaimer, the term of this patent is extended or adjusted under 35 U.S.C. 154(b) by 0 days.

(21) Appl. No.: 10/813,246

(22) Filed: Mar. 30, 2004

(65) Prior Publication Data

US 2005/0041431 A1 Feb. 24, 2005

(30) Foreign Application Priority Data

Aug. 21, 2003 (CN) .............................. 03 1 52803

(51) Int. Cl.
*G02B 7/18* (2006.01)
(52) U.S. Cl. ...................... 359/593; 359/596; 359/877; 126/577
(58) Field of Classification Search ................ 359/850, 359/851, 853, 855, 591–598
See application file for complete search history.

(56) References Cited

U.S. PATENT DOCUMENTS

| | | | |
|---|---|---|---|
| 4,466,423 A | * | 8/1984 | Dolan et al. ................ 126/571 |
| 4,586,488 A | | 5/1986 | Noto |
| 4,649,899 A | * | 3/1987 | Moore ........................ 126/578 |
| 4,883,340 A | | 11/1989 | Dominguez |
| 4,922,088 A | | 5/1990 | Kasuya |
| 4,978,198 A | * | 12/1990 | Jalas .......................... 359/592 |
| 5,317,145 A | * | 5/1994 | Corio ....................... 250/203.4 |
| 5,493,824 A | * | 2/1996 | Webster et al. ............... 52/200 |
| 5,648,873 A | | 7/1997 | Jaster et al. |
| 5,787,878 A | * | 8/1998 | Ratliff, Jr. ................... 126/680 |
| 6,465,766 B1 | | 10/2002 | Zhang |

FOREIGN PATENT DOCUMENTS

| | | | |
|---|---|---|---|
| EP | 1033591 | | 9/2000 |
| JP | 61027517 A | * | 2/1986 |
| JP | 63068806 A | * | 3/1988 |

* cited by examiner

*Primary Examiner*—Mark A. Robinson
*Assistant Examiner*—Mark Consilvio
(74) *Attorney, Agent, or Firm*—Jenkens & Gilchrist, PC

(57) ABSTRACT

This invention relates to a directed reflection light collecting device with planar reflectors, wherein a number of planar reflectors are arranged on a frame in mutual parallel. This frame is rotatably supported via a transversal main turning shaft on the supports of an azimuth angle adjusting mechanism. The altitudinal angle adjusting mechanism drives the frame in a controlled manner causing the planar reflectors on it to move. In this invention, the altitudinal angle of a number of planar reflectors is synchronized via a simple frame structure so that they can always project the reflected sunlight in a substantially fixed direction into the given area in conjunction with the azimuth angle adjusting mechanism.

10 Claims, 17 Drawing Sheets

DIRECTED REFLECTION LIGHT COLLECTING DEVICE WITH PLANAR REFLECTORS

CROSS REFERENCE TO RELATED APPLICATIONS

This application claims priority from Chinese Patent Application No. 03152803.1, entitled "Directed Reflection Light Collecting Device with Planar Reflectors," filed on Aug. 21, 2003.

FIELD OF THE INVENTION

This invention relates to a natural light collecting and lighting device that utilizes solar energy, in particular a directed reflection light collecting device with planar reflectors.

BACKGROUND OF THE INVENTION

Continuous world population growth and sustained development of the global economy has given rise to a rapid increase in the demand for lighting. Lighting is one of the most energy-consuming demands, as most people in developed or developing countries work and live in rooms with artificial lighting. However, the peak demand for indoor lighting takes place in the daytime when there is abundant sunlight. 40% of power for lighting is consumed during this time period. Therefore, development and utilization of inexhaustible solar energy resources can be of great value to energy-savings. Such savings can, in turn, greatly reduce the $CO_2$ discharge from power plants, resulting in a better ecological environment and paving a strategic route to sustainable economic development.

Furthermore, as land resources become more expensive in modern society, residential houses are generally designed in an architectural layout that maximizes exterior wall exposure to sunlight in an effort to meet the lighting requirements of residents. In many large public buildings, for instance shopping malls, large, open architectural areas (referred to as skylights) are designed, which render precious space useless. Even so, such large buildings remain mainly dependant on artificial lighting. To minimize waste of space resources and obtain good natural lighting, people have been exploring various light collecting technologies with the potential to maximize the natural light environment For more than two decades, the technology to harness sunlight for interior lighting has been a focus of research in many countries. This technology can be roughly grouped into three types: light transmission with light pipes, light transmission with optical fibers and direct reflection lighting with planar reflectors, such as the prismatic light pipes produced by the 3M Company of Minneapolis, Minn., and the optical fibers light collector Himawari system made in Japan. Although such media as light pipes and optical fibers have some superiority in light transmission, they are expensive and it is difficult to apply them in practical ways.

Direct reflection lighting with planar reflectors is an economic and practical way to harness light with a reasonable performance to price ratio. The planar reflectors are installed on the tops of buildings, allowing the interiors direct access to reflected sunlight; secondary reflectors can be installed to further reflect light into rooms. For instance, in U.S. Pat. Nos. 4,883,340, 4,586,488 and 4,922,088, light is obtained by reflecting sunlight using planar reflectors. In U.S. Pat. No. 4,883,340, a number of parallel planar reflectors are fixed on supports. At the lower end of the supports, an azimuth angle adjustment mechanism controls the azimuth angle of the planar reflectors. However, as the altitudinal angle of the sun changes continuously throughout the day, the direction of the sunlight reflected by planar reflectors also changes. As a result, the projection of light from this light collection device moves continuously with the change of the sun's altitudinal angle, making it impossible to get light in a fixed direction. Furthermore, in this patent, the spacing of planar reflectors is fixed, thus, there may be unlighted spaces between the projections of reflected light from the planar reflectors at higher sun altitudinal angles, and overlapping may occur at lower altitudinal angles To avoid such overlapping, the planar reflectors need to be more widely spaced, which results in an oversized installation and wasted space. Both devices in U.S. Pat. Nos. 4,586,488 and U.S. Pat. No. 4,922,088 have realized reflection in a fixed direction, but due to structural defect, two planar reflectors can only be arranged on separate sides of the turning shaft, leaving an unlighted space in the reflected light projection.

SUMMARY OF THE INVENTION

This invention is primarily aimed at providing a directed reflection light collecting device with planar reflectors for lighting a given area with sunlight projection. In this invention, the altitudinal angle of a number of planar reflectors can be adjusted in a synchronized manner by means of a simple frame structure so that the reflected sunlight is always projected in a substantially fixed direction into the given area in conjunction with the azimuth angle adjusting mechanism.

This invention is also aimed at providing a directed reflection light collecting device with planar reflectors, in which the spacing between the planar reflectors can be adjusted in conjunction with the altitudinal angle adjustment of these planar reflectors so as to make maximum use of the area of each planar reflector to reflect the sunlight.

This invention is also aimed at providing a directed reflection light collecting device with planar reflectors, which can ensure basically no overlapping or unlighted space for the reflected light projection of all planar reflectors in the given area to realize the purpose of sufficient utilization of sunlight for sufficient lighting and even heating.

The above objectives of this invention can be realized with the following technical scheme: a directed reflection light collecting device with planar reflectors, comprising two or more planar reflectors; an azimuth angle adjusting mechanism and an altitudinal angle adjusting mechanism of the planar reflectors; the azimuth angle adjusting mechanism including a base, supports, a circular rail with central axial line ZZ'; and a driving mechanism, wherein, the two or more planar reflectors are arranged in mutual parallel on a frame; the altitudinal angle adjusting mechanism including at least one transversal main turning shaft parallel with the planar reflectors; the frame being rotatably supported via this transversal main turning shaft on the supports of the azimuth angle adjusting mechanism; the altitudinal angle adjusting mechanism driving this frame in a controlled way to enable movement of planar reflectors on it; the altitudinal changing angle of these planar reflectors being half of the sun altitudinal changing angle.

In this way, this invention, with its altitudinal angle adjusting mechanism and azimuth angle adjusting mechanism, can adjust the altitudinal angle and azimuth angle of the planar reflectors in conjunction with the change of sunlight direction so that the sunlight reflected by the planar reflectors is projected in a substantially fixed direction into the given area, enabling this given area to receive sunlight all day long. Moreover, this invention features a structure combining a number of parallel planar reflectors within the same frame. Therefore, the altitudinal angle adjusting mechanism can realize altitudinal angle adjustment of a number of planar reflectors on the frame simply by moving this frame. Compared with the previous technology which requires separate adjustment of each planar reflector, it is obvious that the structure has been greatly simplified, and the equipment manufacturing cost lowered.

In one embodiment, the frame of this invention can be in an integral rigid structure, with planar reflectors fixed on it at certain spacing in parallel, and the transversal main turning shaft in rigid connection with the frame, the altitudinal angle adjusting mechanism driving the transversal main turning shaft to rotate in a controlled way to rotate the whole rigid frame, thereby adjusting the altitudinal angle of the planar reflectors on it in a synchronized manner.

In another embodiment of this invention, the frame of this invention can be a parallel four-connecting-rod mechanism, on the two parallel connecting rods along the length of this parallel four-connecting-rod mechanism can be hinged with two or more parallel connecting rods in height direction, the planar reflectors are respectively fixed on all parallel connecting rods moving in synchronization of this parallel connecting rod mechanism in height direction to adjust the altitudinal angle of planar reflectors and their mutual spacing with the movement of the parallel connecting rod mechanism.

The parallel connecting rod mechanism is not only simple in structure with good technical performance, the corresponding connecting rods can remain parallel at all times, therefore, when the planar reflectors are respectively fixed on the connecting rods in parallel movement, all planar reflectors can move in a parallel track as long as one rod is driven. In the movement of parallel connecting rods, not only the altitudinal angle of planar reflectors is adjusted, but also the vertical distance between adjacent planar reflectors, or spacing, is adjusted concurrently by changing the angle between adjacent connecting rods. This enables the spacing of a number of parallel planar reflectors to change in conjunction with the change in the sun altitudinal angle, ensuring maximum use of the area of each planar reflector to reflect the sunlight.

Furthermore, in this invention, the planar reflectors are in rectangular shape, and in this multiple parallel planar reflector assembly, the connecting lines of four apexes of every two adjacent planar reflectors on the same side form a rhombus, in which one of the diagonal lines is always parallel with the central axial line ZZ' of the circular rail.

In this way, the projection of sunlight reflected by each planar reflector just joins together and remains so all the time. This ensures that the reflected light projection of all planar reflectors in the given area is basically free of overlapping or unlighted space and can avoid possible unlighted space between the projections of planar reflectors or blocking of reflectors as in the case of some existing technologies to accomplish full utilization of sunlight for sufficient lighting and even heating.

To ensure that one of the diagonal lines remains parallel with the central axial line ZZ' of the circular rail during the movement of the parallel connecting rod mechanism, the power for driving the parallel connecting rod mechanism can be a reciprocating linear moving mechanism, which forms the altitudinal angle adjusting mechanism together with the transversal main turning shaft. The reciprocating linear moving mechanism is connected to one of the connecting rods of the parallel connecting rod mechanism via its moving part. The moving line of this part is parallel with one diagonal line of the rhombus. The linear movement of the moving part of reciprocating linear moving mechanism pushes the movement of the parallel connecting rod mechanism to adjust the altitudinal angle and spacing of planar reflectors.

In another embodiment, the power for driving the parallel connecting rod mechanism can also be from the transversal main turning shaft connected with the altitudinal angle motor driving mechanism. In this case, the parallel connecting rod mechanism is in rigid connection with the transversal main turning shaft via a connecting rod. A straight line passing this rigid connection point and parallel with one diagonal line of the rhombus intersects the adjacent connecting rod at another point, where a sliding block or pulley is provided and can slide along a straight sliding trough mounted between the rigid connection point and the intersecting point. The transversal main turning shaft is connected with the driving motor (including a reducer) of the altitudinal angle adjusting mechanism at one end.

The azimuth angle adjusting mechanism in this invention can include a base, supports, a circular rail with central axial line ZZ' and a driving mechanism. The driving mechanism drives the supports so that the planar reflectors on the frame can rotate around the central axial line ZZ' of the circular rail to adjust its azimuth angle. The azimuth changing angle of planar reflectors is equal to the sun azimuth changing angle.

In this mechanism, the driving mechanism for adjusting the azimuth angle comprises a motor (including a reducer) and friction wheels connected at the motor (including a reducer) output end. The driving mechanism is fixed on the supports bottom, and the rail is in rigid integration with the base. The friction wheels are in contact with the rail to drive the supports to rotate around the axial line ZZ' along the rail.

In another embodiment, the driving mechanism for azimuth angle adjustment can comprise a motor (including a reducer) and friction wheels connected at the motor (including a reducer) output end. The driving mechanism is fixed on the base, the rail is in rigid connection with the supports and is rotatably supported on the base via rollers or balls fixed on the base. The friction wheels are in contact with the rail to drive the rail itself together with the supports to rotate.

With both ways of implementing azimuth angle adjustment as described above, the sunlight can be eventually projected in the direction of the central axial line ZZ' of the circular rail. When the central axial line ZZ' of the circular rail is perpendicular to the horizontal plane, or the set sunlight projecting direction is perpendicular to the horizontal plane, there is no overlapping or unlighted space between projected light from the planar reflectors so the area of each reflector is fully utilized.

Furthermore to enable the sunlight reflected by the light collecting device to be projected in a substantially fixed direction other than the central axial line ZZ' of the circular rail, the azimuth changing angle of the frame rotating around the central axial line ZZ', the planar reflectors on the frame and the supports for the frame should be half of the sun azimuth changing angle so that by selecting proper initial conditions, planar reflectors will be able to project the sunlight to other fixed location.

To monitor the sun position for tracking purpose, two types of sensors have been proposed in this invention to monitor the sun position and in fairly simple structure. One of them is comprised of a light shading post, photosensitive elements arranged in four directions around the post, and a base for burying the photosensitive elements at a certain depth. For each photosensitive element, a reflection shading block is arranged above the ⅙–½ of receiving window close to the light shading post side wall. Another sensor is formed by a cylindrical barrel, large lens, four small lenses and four photosensitive elements corresponding to the four small lenses. The large lens is located at the most front of the cylindrical barrel, the four small lenses in the middle of the barrel and the four photosensitive elements at the rear end of the barrel. The output ends of the photosensitive elements are connected to the processing circuit. For the specific principle of application of sensors and processing circuit, references is made to U.S. Pat. No. 6,465,766B1.

The planar reflectors in this invention can be glass mirrors, or flat plates with high-efficiency light reflecting films applied onto their surfaces.

By means of the two-dimensional adjusting mechanisms for azimuth angle and altitudinal angle and under the control of sensor and processing circuit, the above mentioned light collecting device performs the function of solar automatic tracking, and the planar reflectors project the sunlight in a substantially fixed direction at all times. Also, the planar reflectors and altitudinal angle adjusting mechanism can be mounted symmetrically above the given area via the transversal main turning shaft, without the need to install them with a cantilever on one side of the transversal main turning shaft of altitudinal angle adjusting mechanism, nor eccentrically to the rotating shaft of the azimuth angle adjusting mechanism, making the driving easier. The whole light collecting device of this invention features compact structure, simple arrangement, good balance and low cost.

It can be seen that the frame structure and the multiple planar reflectors mounted on it in this invention are driven by the reciprocating linear moving mechanism or the transversal main turning shaft connected with the altitudinal angle motor driving mechanism, for synchronized adjustment of planar reflectors altitudinal angle and spacing, and they automatically track the sun continuously by means of the rail type azimuth angle adjusting mechanism, thereby reflecting sunlight in a substantially fixed direction into a given area. The whole device takes the minimum possible space resources and has discarded forms of excessive complexity, thus both balance performance and movement performance have been improved. The device also lays an ideal foundation for the spreading of applications of directed reflection light collecting device with planar reflectors.

DESCRIPTION OF EMBODIMENTS OF THE INVENTION

Figure 1:
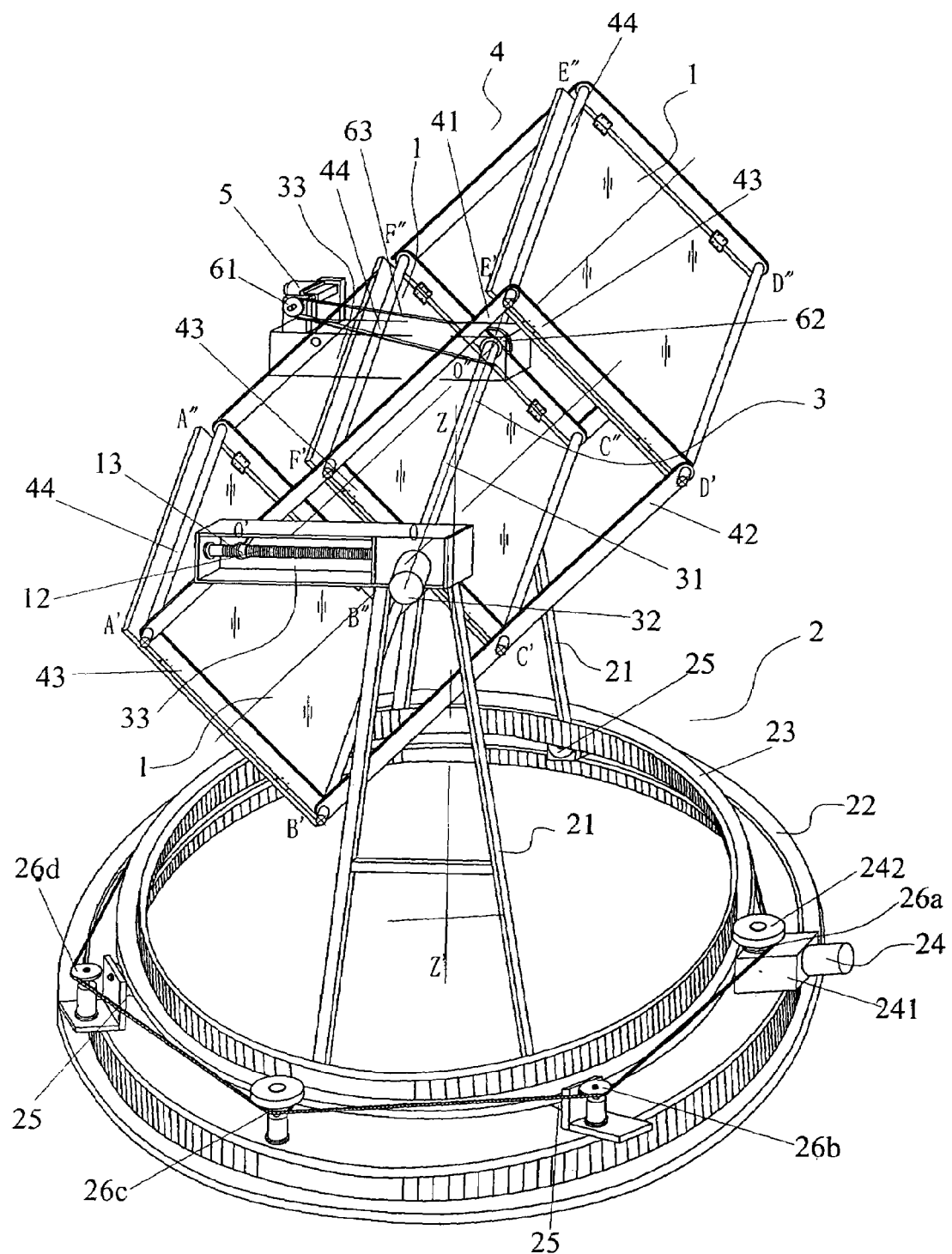
FIG. 1 is the stereo structure schematic diagram of a directed reflection light collecting device with planar reflectors in embodiment 1 of this invention.

As shown in FIGS. 1–6B, a directed reflection light collecting device with planar reflectors in this invention comprises two or more planar reflectors 1, an azimuth angle adjusting mechanism 2 and an altitudinal angle adjusting mechanism 3 of the planar reflectors, the azimuth angle adjusting mechanism 2 includes a base, supports, a circular rail with central axial line ZZ' and a driving mechanism. The two or more planar reflectors 1 are set parallel to each other on a frame 4. The altitudinal angle adjusting mechanism 3 includes at least one transversal main turning shaft 31 parallel with the planar reflectors 1. The frame 4 is rotatably supported via this transversal main turning shaft 31 on the supports 21 of the azimuth angle adjusting mechanism 2, and the altitudinal angle adjusting mechanism 3 drives this frame 4 in a controlled manner to enable movement of the planar reflectors 1. The altitudinal changing angle of the planar reflectors 1 is half of the sun altitudinal changing angle. The reason for this will now be described.

With the sun altitudinal angle continuously changing, the inclining angle of the planar reflectors should also be continuously adjusted to enable projection of sunlight in a substantially fixed direction after reflection by planar reflectors 1. It is known from basic knowledge of geometric optics that the changing angle of the planar reflectors inclining angle should always be half of the sun altitudinal changing angle. This basic principle is clearly shown in FIG. 5, and should be applied in controlling the rotation of planar reflectors by detecting the sun position.

In this way, with the adjustment of the frame 4 by the altitudinal angle adjusting mechanism 3 and azimuth angle adjusting mechanism 2, the altitudinal angle and azimuth angle of a number of planar reflectors on the frame 4 can change with the change in the altitudinal angle and azimuth angle of the sun so that the sunlight reflected by planar reflectors 1 is projected into the given area in a substantially fixed direction, and sunlight is received in this given area all day long. Furthermore, as a structure combining multiple parallel planar reflectors 1 and frame 4 is adopted in this invention, the altitudinal angle adjusting mechanism 3 can achieve the altitudinal angle adjustment of multiple planar reflectors 1 on the frame 4 by adjustment of the frame 4. This has greatly simplified the structure and lowered the equipment manufacture cost as compared with the technology of making separate adjustment of each of the planar reflectors 1.

Figure 2:
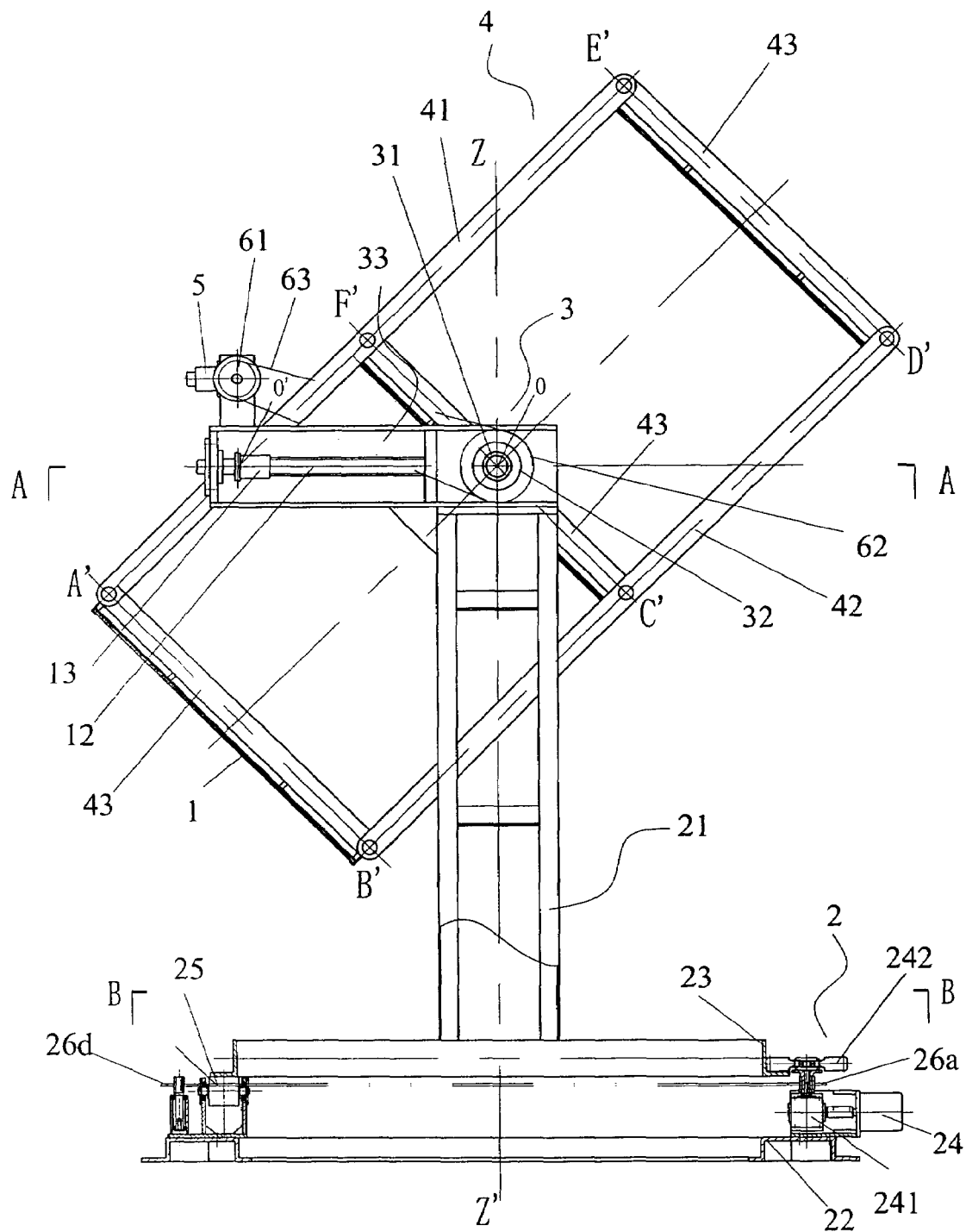
FIG. 2 is the plan view of the light collecting device of FIG. 1.

As shown in FIGS. 1 and 2, the frame 4 in this invention is a parallel four-connecting-rod mechanism, in which two parallel connecting rods 41 and 42 along the length can be hinged with two or more parallel connecting rods 43 in height direction. The planar reflectors 1 are respectively fixed on the parallel connecting rods 43 moving in synchronization in the height direction with the parallel connecting rod mechanism to enable adjustment of the altitudinal angle and mutual spacing of planar reflectors 1 with the movement of the parallel connecting rod mechanism.

The parallel connecting rod mechanism is not only simple in structure with good technical performance, the corresponding connecting rods can remain parallel at all times. Therefore, when the planar reflectors 1 are respectively fixed on the connecting rods in parallel movement, all planar reflectors 1 can move in a parallel track as long as one rod is driven. In the movement of parallel connecting rods, not only the altitudinal angle of the planar reflectors 1 is adjusted, but also the vertical distance between adjacent planar reflectors 1, or spacing, is adjusted concurrently by changing the angle between adjacent connecting rods. This enables the spacing of a number of parallel planar reflectors 1 to change with the change in the sun altitudinal angle to thereby maximize the area of each planar reflector to reflect sunlight.

Figure 3:
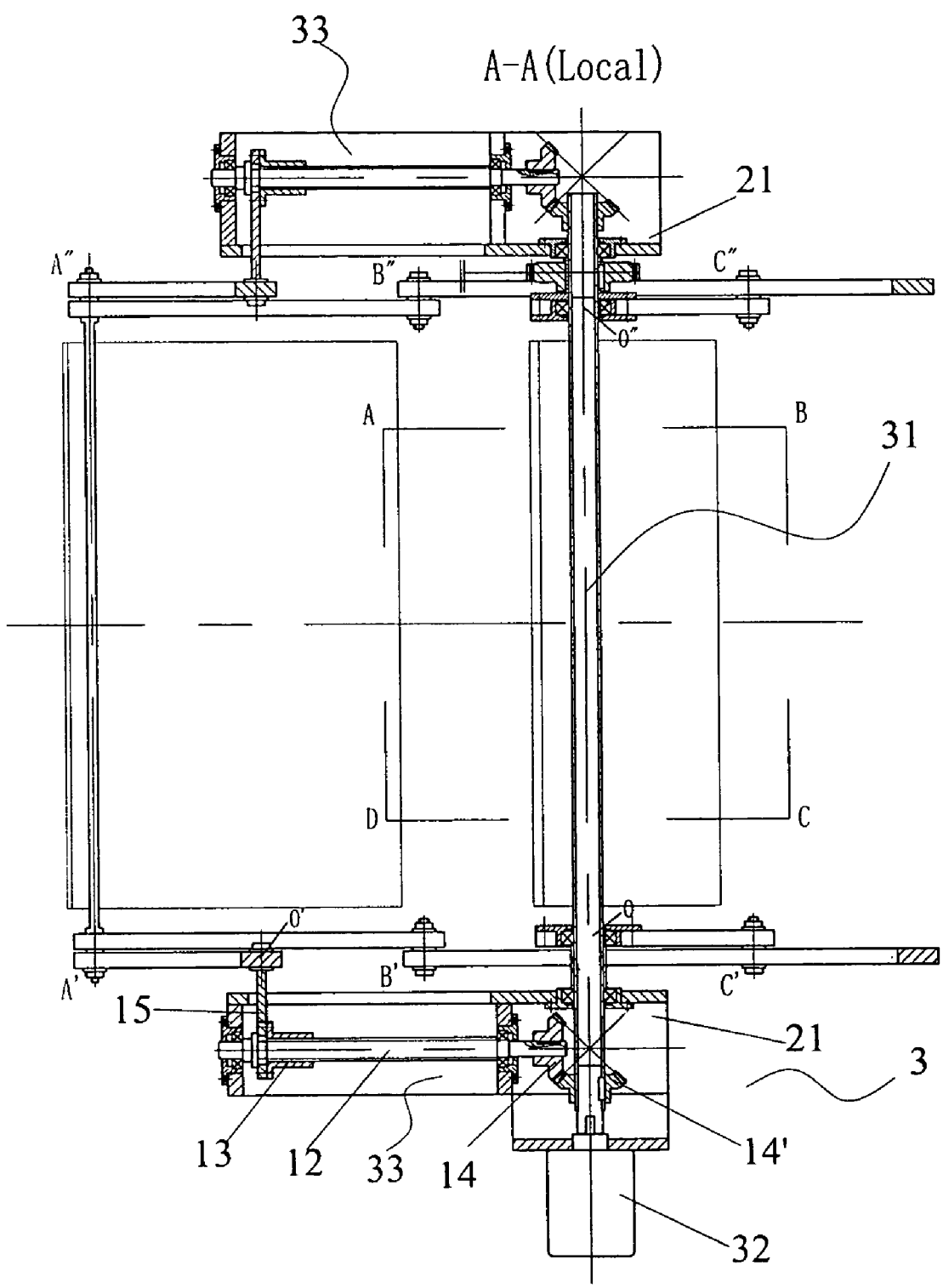
FIG. 3 is the A—A local sectional view of FIG. 2.

As shown in FIGS. 2 and 3, in this embodiment, the power for each parallel connecting rod mechanism can be from a reciprocating linear moving mechanism 33, which can form the above altitudinal angle adjusting mechanism with the transversal main turning shaft 31. The reciprocating linear moving mechanism 33 can be a screw-nut mechanism, fitted between the transversal main turning shaft 31 (hinged supporting point O) and pin 15 at point O' of the connecting rod A'F'E'. The screw 12 is connected at one end with the transversal main turning shaft 31 via a conical gear pair 14 and 14', and the nut 13 at the other end is hinge supported with pin 15 at point O' of the connecting rod A'F'E'. The straight line for movement of nut 13 is parallel with the diagonal line A'C' (or F'D'), and intersects the axial line of transversal main turning shaft 31. The rotating movement of screw 12 is converted to the reciprocating linear movement of nut 13, and pin 15 hinged with nut 13 follows the linear movement of nut 13. In this way, the motor driving mechanism 32 can rotate screw 12 so that the nut 13 can move with the connecting rod A'F'E' to enable change in the angle between connecting rods of the parallel connecting rod mechanism, and further make the planar reflectors 1 move to adjust the altitudinal angle and mutual spacing of the planar reflectors 1.

Figure 4:
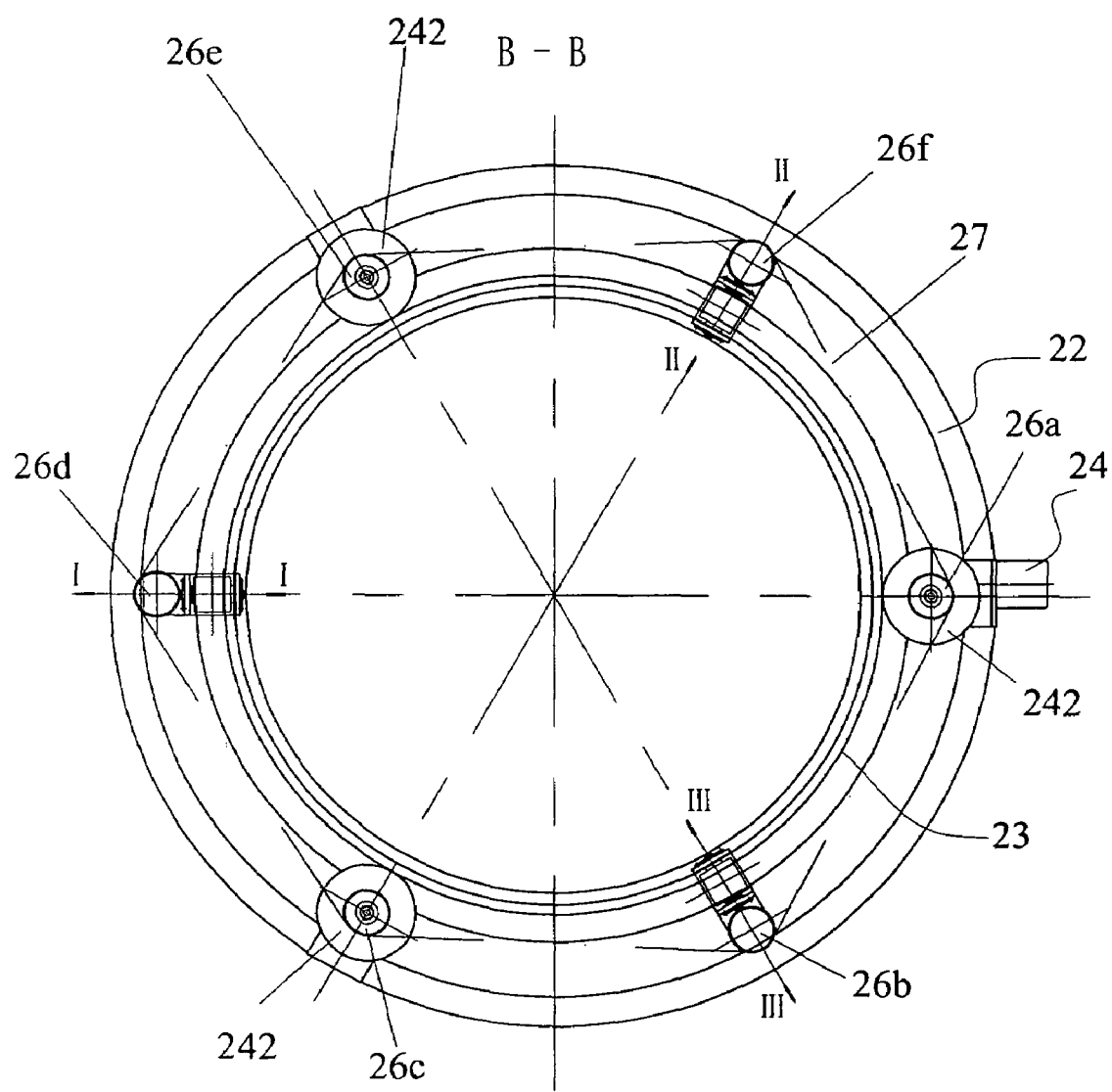
FIG. 4 is the B—B view of FIG. 2.
Figure 5:
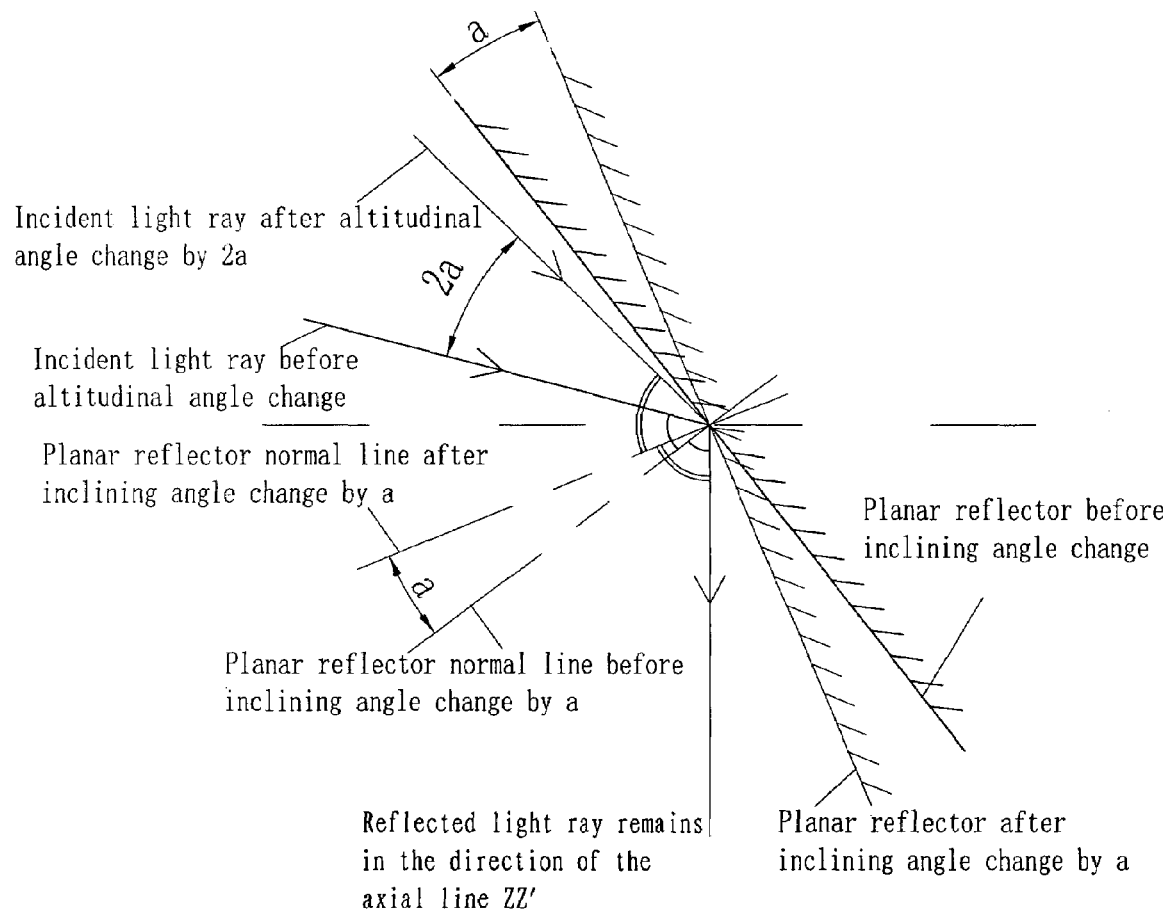
FIG. 5 is the principle diagram of the reflected light remaining in the direction of the axial line ZZ' when the planar reflectors in FIG. 1 rotate.

As shown in FIGS. 2 and 4, the azimuth angle adjusting mechanism 2 mainly comprises a base 22, supports 21, a circular rail 23 with central axial line ZZ' and its motor driving mechanism 24 for azimuth angle adjustment. The motor driving mechanism 24 is comprised of motor and reducer 241 and friction wheels 242 etc. Friction wheels 242 are in rigid connection on the output shaft of reducer 241, the bottom of rail 23 set around the area ABCD is supported on three rollers 25 (only one of them is shown in FIG. 2), which are mounted respectively at locations I—I, II—II and III—III as shown in FIG. 4. These three rollers 25 and the motor driving mechanism 24 are all mounted on the base 22, rail 23 is in rigid connection with supports 21 and is supported on base 22 via the three rollers 25, friction wheels 242 are in contact with rail 23 to drive the rail itself to rotate together with the supports 21 around the central axial line ZZ'. In the diagram of this embodiment, three friction wheels 242 are shown, but there can be one or more friction wheels 242, depending on the driving force required by the device of this invention. In case of a number of friction wheels 242, they can be further arranged at equal distance along the outer wall of rail 23. As shown in FIG. 4, the friction wheels 242 can be driven in synchronization via six sprockets 26a–26f (three of them as take-up units) and chain 27. It should be pointed out that, the supporting rollers 25 and friction wheels 242 in this embodiment are interchangeable, i.e., the friction wheels contact with the upper or lower edge of rail 23, while the rollers or balls run against the side of rail 23.

To monitor the sun position for tracking purpose, the directed reflection light collecting device with planar reflectors in this invention can also include a sensor 5 to monitor the sun position and processing circuit to receive the signals from sensor 5 (not shown). For more information regarding the sensor 5 and the sun position and processing circuit, please refer to U.S. Pat. No. 6,465,766B1, entitled "Sunlight Tracking Sensor and its Use in Full-Automatic Solar Tracking and Collecting Device," which is incorporated herein by reference. This sensor 5 and its processing circuit can control the azimuth angle adjusting mechanism and altitudinal angle adjusting mechanism of the planar reflectors to adjust the azimuth angle and altitudinal angle of the planar reflectors so that they follow the change of the sunlight direction. In this way, the sunlight reflected by the planar reflectors in this invention can be projected in a substantially fixed direction into the required projection area ABCD (FIG. 3).

To realize control of the altitudinal angle adjusting mechanism of planar reflectors with sensor 5 so that the altitudinal changing angle of the planar reflectors is half of the sun altitudinal changing angle, the specific structure adopted is as shown in FIG. 2, the sensor 5 mounted facing the sun detect change of sun position, which is converted to change in the planar reflector angle via a driving mechanism with a radius ratio of $R_1:R_2=1:2$. This driving mechanism can be a synchromesh gear belt driving mechanism, comprising pulley 61 with a radius of $R_1$, pulley 62 with a radius of $R_2$ and synchromesh gear belt 63, in which pulley 62 is in rigid connection with the connecting rod F"C", and sensor 5 in rigid connection with pulley 61 with the radius of $R_1$. In this way, the processing circuit can adjust the planar reflectors for the required azimuth angle and ½ altitudinal angle according to the signals from sensor 5 on pulley 61.

Figure 6A:
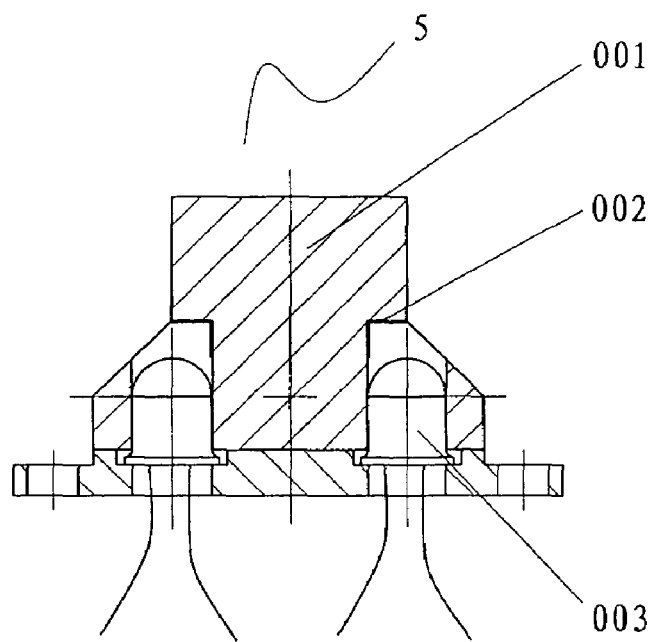
FIGS. 6A–6B are the schematic diagrams of sensor structure in FIG. 21.
Figure 6B:
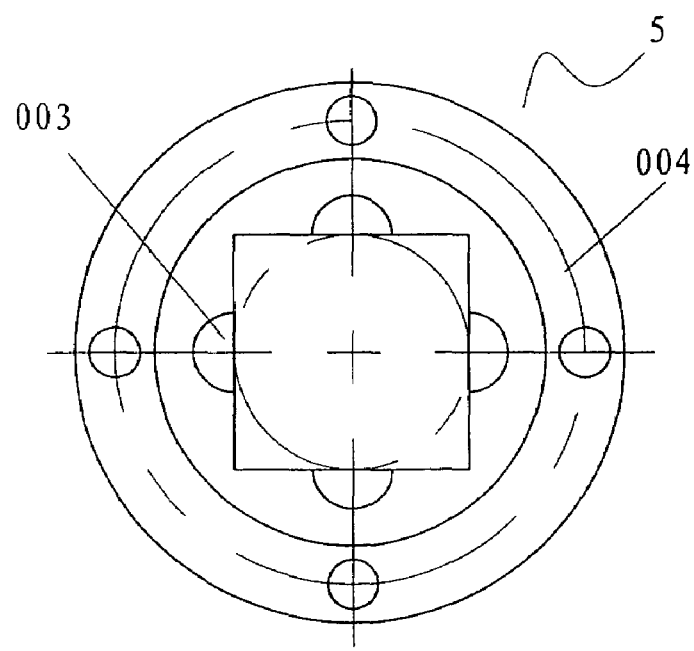

The structure of sensor 5 can be as shown in FIGS. 6A–6B, comprised of a light shading post 001, four photosensitive elements 003 arranged on four sides of the post 001 and a base 004 for burying the photosensitive elements 003 at a certain depth. For each photosensitive element, a reflection shading block 002 is arranged above the ⅙–½ of receiving window close to the light shading post side wall, and the photosensitive elements 003 are photosensitive diodes. The photosensitive diodes 003 are buried in the base 004 at a certain depth to enhance the ability of the sensor to avoid interference by stray light; also, with the reflection shading block 002 arranged to shade ⅙–½ of the receiving window of the diodes, the part of the window most sensitive to receiving is exposed, making the sensor more sensitive, in particular to angular deflections at small angles.

When the sun azimuth angle changes, sensor 5 transmits an azimuth angle position signal to the processing circuit to drive the motor and its reducer 241, which further moves the rail 23 and the whole parallel connecting rod mechanism on the supports 21 to rotate around the axial line ZZ' so that the azimuth angle of all planar reflectors 1 on the parallel connecting rod mechanism is adjusted to the required position.

When the sun altitudinal angle changes, sensor 5 also transmits an altitudinal angle position signal to the processing circuit to drive the motor and its reducer 32, which rotates transversal main turning shaft 31. The power is transmitted via conical gear pair 14 and 14' to screw 12 so that nut 13 moves linearly along screw 12. As the nut is hinged with pin 15 at point O', the angle between the adjacent connecting rods A'F'E' and F'C' of the parallel connecting rod mechanism will change so that connecting rods A'B' and E'D' and connecting rod F'C' rotates by the same angle to realize the adjustment of altitudinal angle of planar reflectors. In the meantime, according to the movement principle of the parallel connecting rod mechanism, the spacing between the book planar reflectors 1 is also adjusted with the change of altitudinal angle. The adjustment of the altitudinal angle of the above described planar reflectors 1 and the spacing between them is performed jointly with a set of a motor and its reducer 32 so the configuration is simple, smart and clear.

Of course, the planar reflectors described in this invention can also be attached to other parts, i.e., the frame 4 can also be two sets of identical parallel four-connecting-rod mechanism A'B'C'D'E'F' and A"B"C"D"E"F", located respectively on both sides of the planar reflectors 1, and pivoted by parallel pivoting rods 44 in the middle. The planar reflectors 1 are thus fixed respectively on the parallel pivoting rods 44, instead of being attached to the parallel connecting rods 43 in the height direction in synchronization movement so that they follow the movement of this parallel connecting rod mechanism to adjust the altitudinal angle of the planar reflectors 1 and their mutual spacing.

To facilitate description, only the case with three planar reflectors 1 is described as an example. Thus, each parallel connecting rod mechanism in this example is in the "日" shape. The transversal main turning shaft 31 is pivoted on the centers O and O" of the intermediate connecting rods F'C' and F'C', then rotatably supported on the topside of supports 21 of the azimuth angle adjusting mechanism, with one end in rigid connection at the output shaft of any motor driving mechanism 32. In fact, the number of planar reflectors 1 mounted on this parallel connecting rod mechanism can be determined according to the area of the projecting zone. As required, more planar reflectors can be mounted along both sides so that the "日" shaped parallel connecting rod mechanism can be further extended.

When the height of all three planar reflectors is less than the distance of the adjacent hinging points of connecting rods, although directed projection of sunlight reflected from the planar reflectors 1 can be ensured by the above described adjusting mechanism, there will be some unlighted space between the projections. To eliminate such spacing, further, the planar reflectors 1 in this invention can be specifically in rectangular shape, with the connecting lines of the four apexes on the same side of every two said adjacent planar reflectors 1 forming a rhombus, in which one of the diagonal lines always remains parallel with the central axial line ZZ' of the circular rail. In this way, the projection of sunlight reflected by each adjacent planar reflector joins together and remains so all the time. This ensures that the projection of all planar reflectors in the given area is free of overlapping or unlighted space and can avoid possible unlighted space between the projections of planar reflectors or the blocking of reflectors as in the case of some existing technologies to accomplish full utilization of sunlight for sufficient lighting and even heating.

Figure 11:
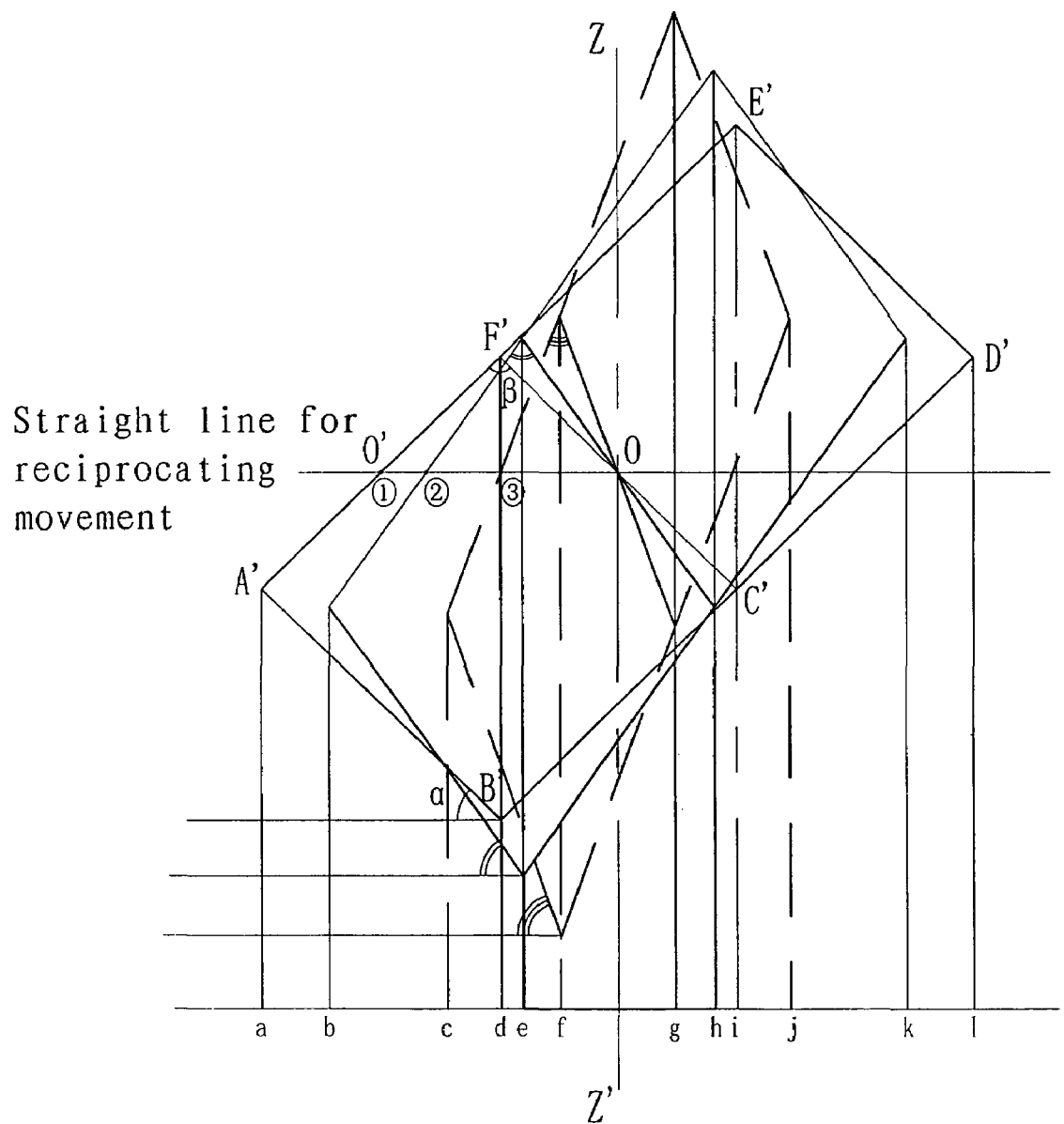
FIG. 11 is the schematic diagram on change of reflected light projection of planar reflectors when the four parallel connecting rods in this invention move the planar reflectors.

The central axial line ZZ' is set perpendicular to the horizontal plane, i.e., the light ray reflected from the planar reflectors is perpendicular to the horizontal plane while one of the diagonal lines in the rhombus being always parallel with the horizontal plane, and the reflected sunlight can be projected vertically into the given area. Further analysis is given in the following with vertical projection as an example in conjunction with the attached figure. FIG. 11 shows schematically the change of projection of light reflected by planar reflectors 1 when the four parallel connecting rods bring the planar reflectors 1 to move in this invention. To simplify, the apex of each of the planar reflectors 1 is approximately taken as the hinging point of the parallel connecting rod mechanism. It can be seen in the figure that, with the change of the sun altitudinal angle θ, as driven by the reciprocating linear moving mechanism, the nut at point O' moves linearly towards point O, and the angle α of planar reflectors changes correspondingly, and at the same time, the angle β between every two adjacent connecting rods of the parallel connecting rod mechanism also changes, i.e., the parallel connecting rod mechanism becomes more narrow to adjust the mutual spacing. When the nut is at the starting point O', or position ①, the projections of the light reflected from the three reflectors are respectively ad, di and il; when it reaches position ②, the projections from the three reflectors become respectively, eh and hk; when it reaches position ③, the projections from the three reflectors again become respectively cf, fg and gj. But no matter how the altitudinal angle and spacing of the planar reflectors 1 change, as driven by the parallel connecting rod mechanism, the projections from the three planar reflectors 1 remain together in the projected area, without unlighted space or overlapping.

In general, in the directed reflection light collecting device with planar reflectors, the altitudinal angle and mutual spacing of multiple planar reflectors 1 can be adjusted in synchronization by means of a parallel connecting rod mechanism driven by a motor-reducer set, with the technical solution that the altitudinal angle adjusting mechanism 3 is supported on the azimuth angle adjusting mechanism 2. When the planar reflector azimuth angle is adjusted into position, the altitudinal changing angle should be adjusted to half of the changing amount of the altitudinal angle of the sun so that the sunlight can be projected in the direction of the central axial line ZZ' of the circular rail. Furthermore, as shown in FIG. 1, the planar reflectors 1 in this device need not be mounted with a cantilever on one side of the transversal main turning shaft 31 of the altitudinal angle adjusting mechanism 3 to make the driving easier. The whole device features good symmetry, unique configuration, compact structure and low cost, which will facilitate its spreading and application.

Figure 7:
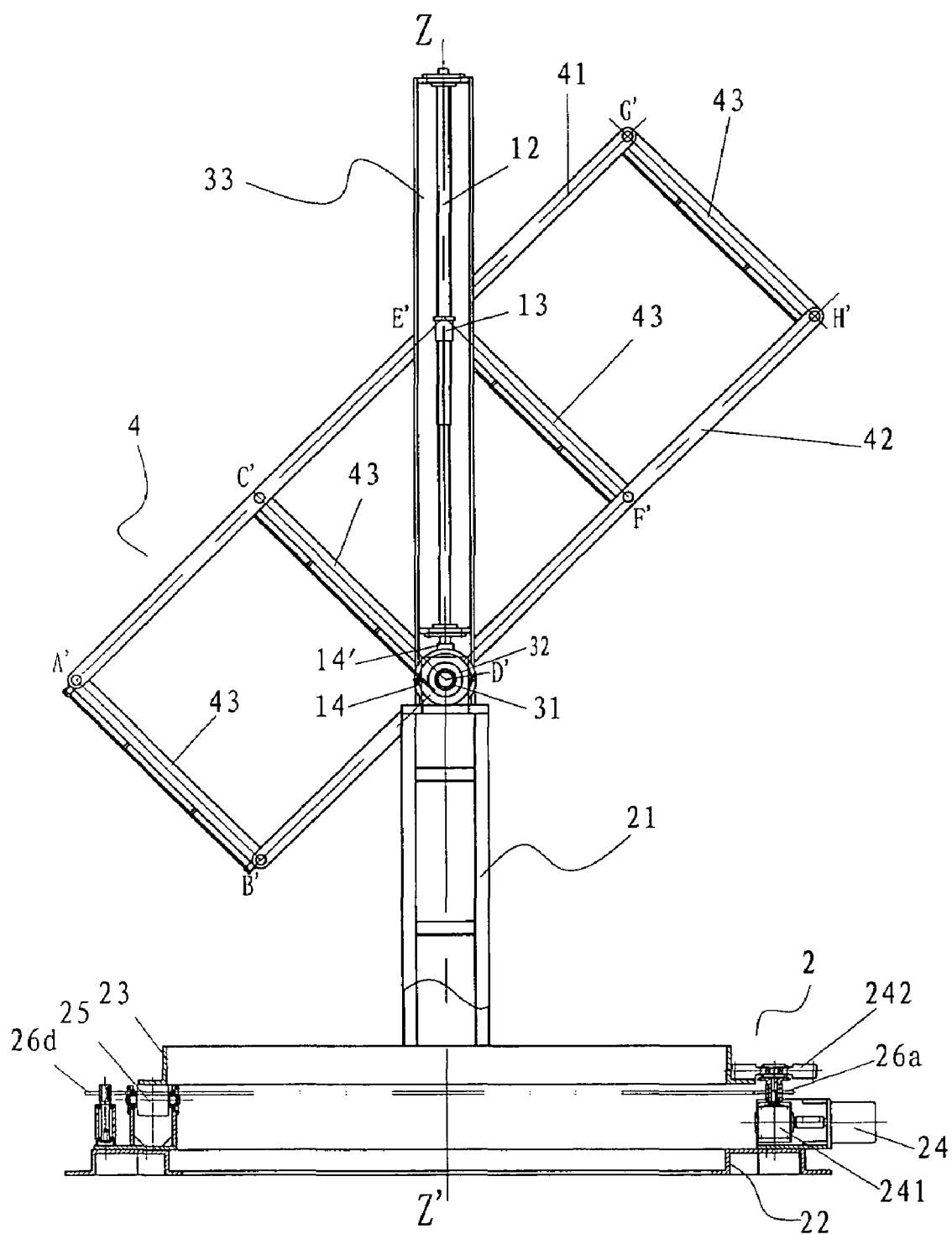
FIG. 7 is the schematic diagram of the directed reflection light collecting device with planar reflectors in another embodiment of this invention.
Figure 8A:
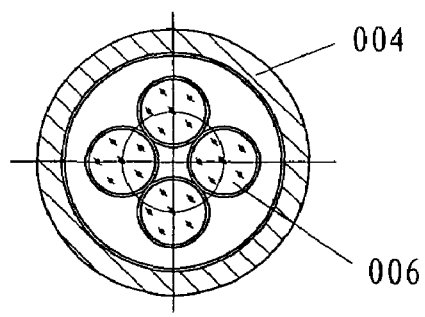
FIGS. 8A–8C are the schematic diagrams of sensor structure in FIG. 7.
Figure 8B:
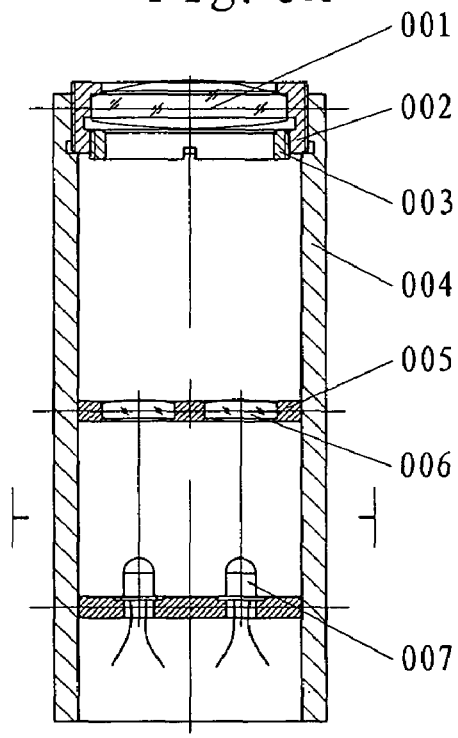
Figure 8C:
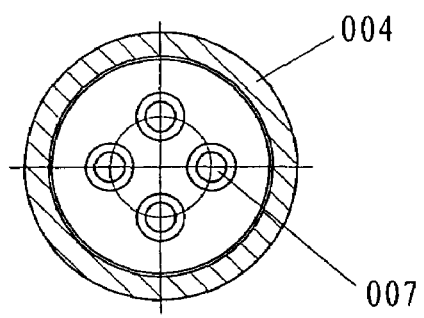

Referring now to FIG. 7, another embodiment of invention is shown. The main differences in this embodiment and previous embodiment are as follows. First, the parallel connecting rod mechanism is in the "日" shape as A'B'D'F'H'G'E'C', in which the hinging point D' of the two connecting rods C'D' and B'D' F'H' in the "Y" connection is hinged onto the transversal main turning shaft 31, the connection points of the other four connecting rods A'C'E'G', A'B', E'F' and G'H' are all hinged, and the transversal main turning shaft 31 is connected with the motor driving mechanism 32. The four planar reflectors 1 are at the same height, equal to the distance of adjacent hinging points of connecting rods so that the connecting lines of four apexes on the same side of every two adjacent planar reflectors 1 form a rhombus, and the reflectors are respectively mounted on connecting rods A'B', C'D', E'F' and G'H' and opposite members. Second, the planar reflectors 1 are comprised of flat plates and high-efficiency light reflecting films applied onto their surfaces. Third, the screw-nut reciprocating linear moving mechanism driving the parallel connecting rod mechanism is mounted at hinging points E' and D', its moving part, nut 13, on one end is in rigid connection by a pin at another hinging point E', and the other end of the screw 12 is connected via conical gear pair 14 and 14' with a transversal main turning shaft 31. The straight line for reciprocating movement of nut 13 is parallel with diagonal line G'F' (or C'B') and intersects the axial line of the transversal main turning shaft 31. The movement of the nut 13 brings the up and down movement of the pin at hinging point E', thus realizing the adjustment of planar reflectors altitudinal angle and spacing in the same way. Fourth, there is a different sensor structure. As shown in FIGS. 8A–8C, this sensor 5 (not shown in FIG. 7) is comprised of a cylindrical barrel 004, a large lens 001, four small lenses 006 and four photo sensitive elements 007 corresponding to the four small lenses 006, with the large lens 001 at the forefront of cylindrical barrel 004, the four small lenses 006 at the middle of the cylindrical barrel 004, and the four photosensitive elements 007 at the rear of the cylindrical barrel 004, and the output ends of photosensitive elements are connected to the processing circuit respectively. When the optical signals from all four photosensitive elements 007 are equal, it indicates that the sensor 5 is directed properly to the sun. When there is a deflection of a light ray, the output signals from two corresponding photosensitive elements will not be equal, and the processing circuit will control the operation of the motor on this basis.

Similarly, the parallel connecting rod mechanism can be a "日" shaped overlapped connecting rod mechanism by adding more planar reflectors on both sides of it.

In operation, the embodiment shown in FIG. 7 will produce the same effect as the environment shown in FIG. 1 and therefore will not be described in detail here.

Figure 9:
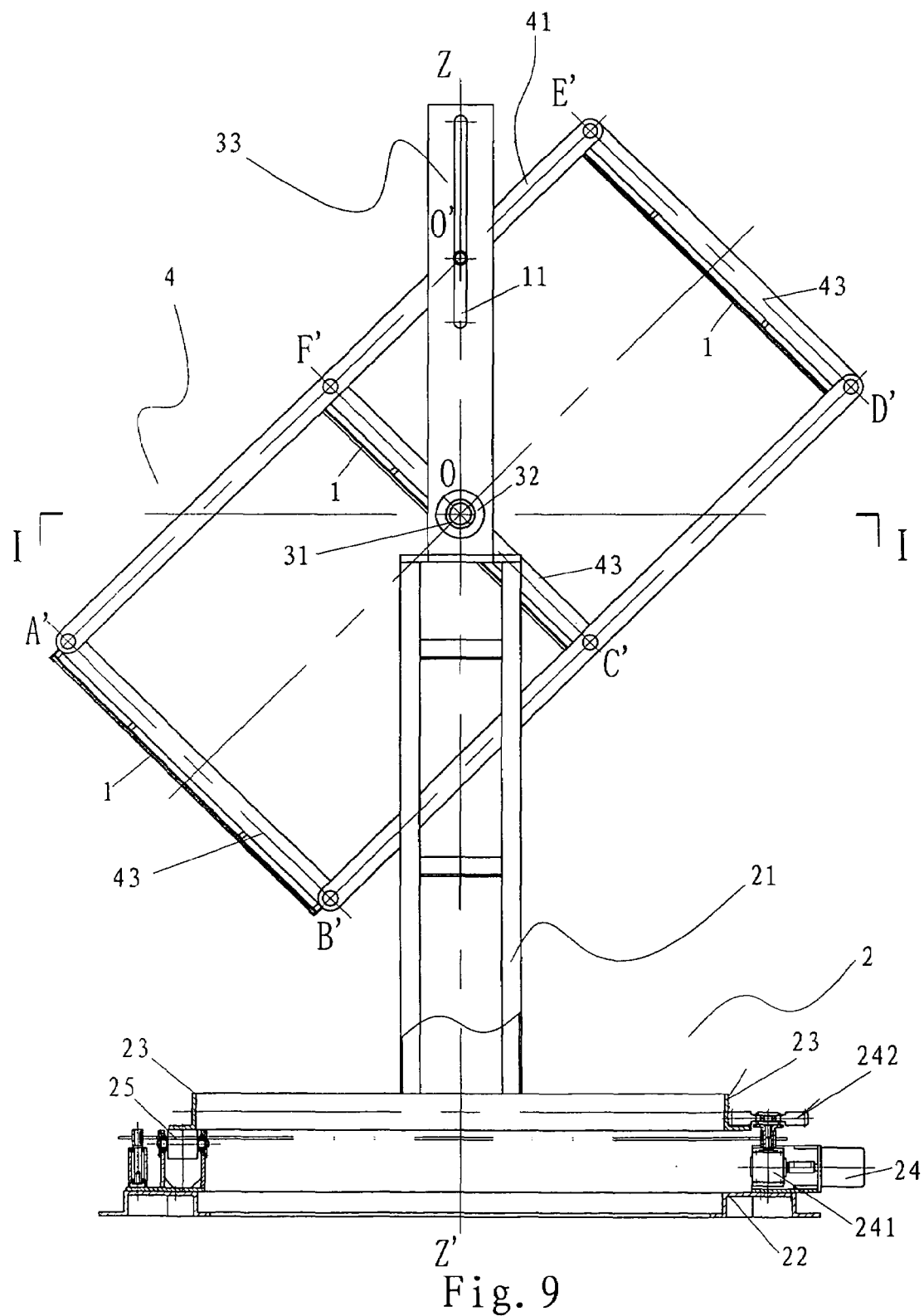
FIG. 9 is the schematic diagram of the directed reflection light collecting device with planar reflectors in yet another embodiment of this invention.
Figure 10:
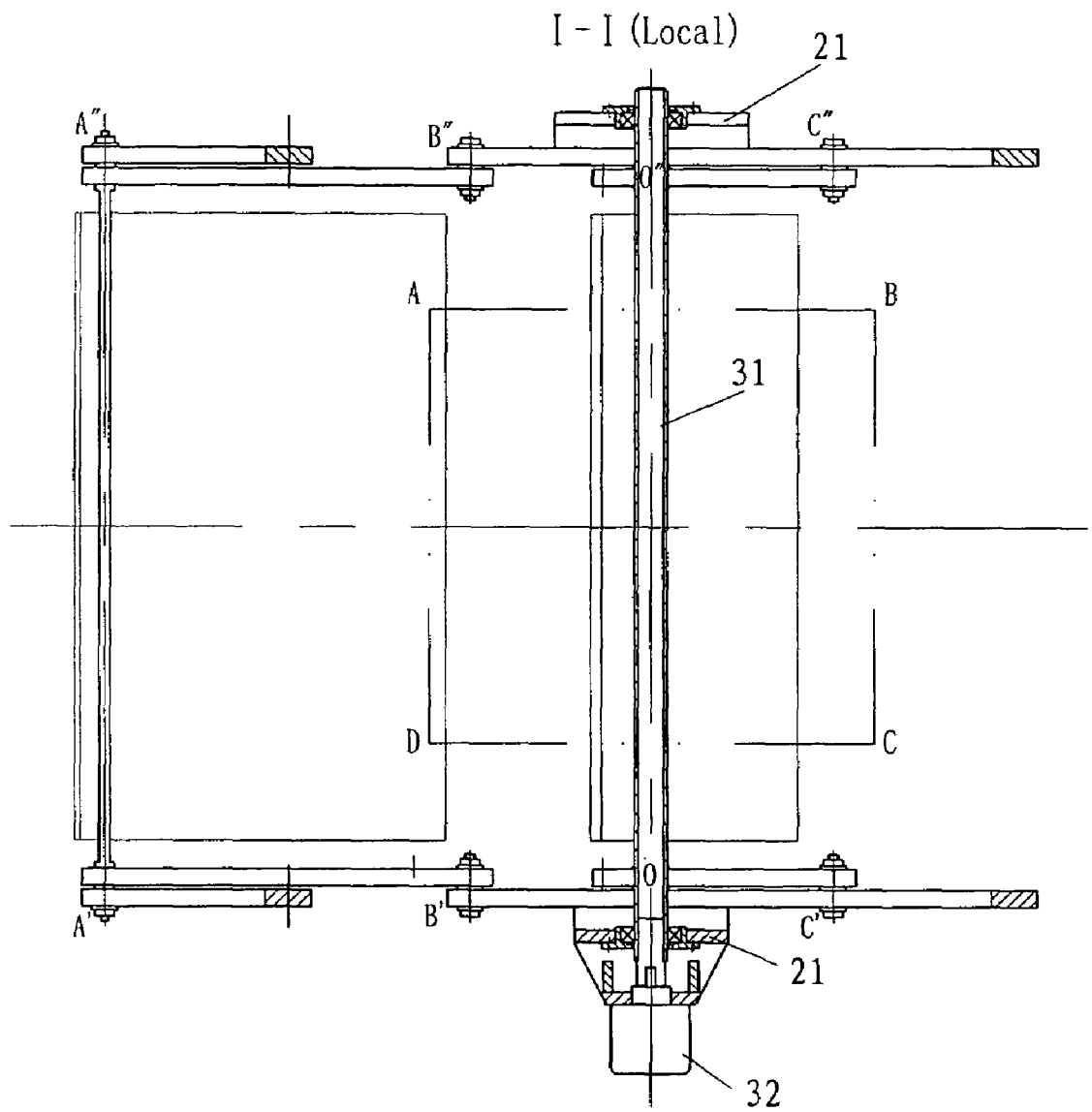
FIG. 10 is the I—I local sectional view of FIG. 9.

Referring now to FIGS. 9 and 10 another embodiment of invention is shown. As compared with the previous embodiment, the main features are that the parallel connecting rod mechanism does not adjust the altitudinal angle and spacing of planar reflectors 1 by the screw-nut reciprocating linear moving mechanism. Instead, the power for the parallel connecting rod mechanism is directly from the transversal main turning shaft 31 connected with altitudinal angle motor driving mechanism 32. The central point O of the connecting rod F'C' in the parallel connecting rod mechanism is in rigid connection with the transversal main turning shaft 31. A straight line crossing at the axial line of the transversal main turning shaft 31 and parallel with the diagonal line F'B' (or E'C') of the connecting rod mechanism intersects the adjacent connecting rod A'F'E' at point O', where a sliding block or pulley is provided and can slide along a straight sliding trough 11 mounted between the rigid connection point O and the intersecting point O'. The transversal main turning shaft 31 is in rigid connection with the motor driving mechanism 32 at one end.

In this way, when the transversal main turning shaft 31 is driven directly by the motor driving mechanism 32, the connecting rod F'C' in rigid connection with the transversal main turning shaft 31 will turn to force the point O' on the connecting rod A'F'E' to slide up and down in the trough 11 via the sliding block or pulley, thereby changing the angle between the connecting rod A'F'E' and the connecting rod F'C' to adjust the altitudinal angle and spacing of the planar reflectors 1.

Figure 12:
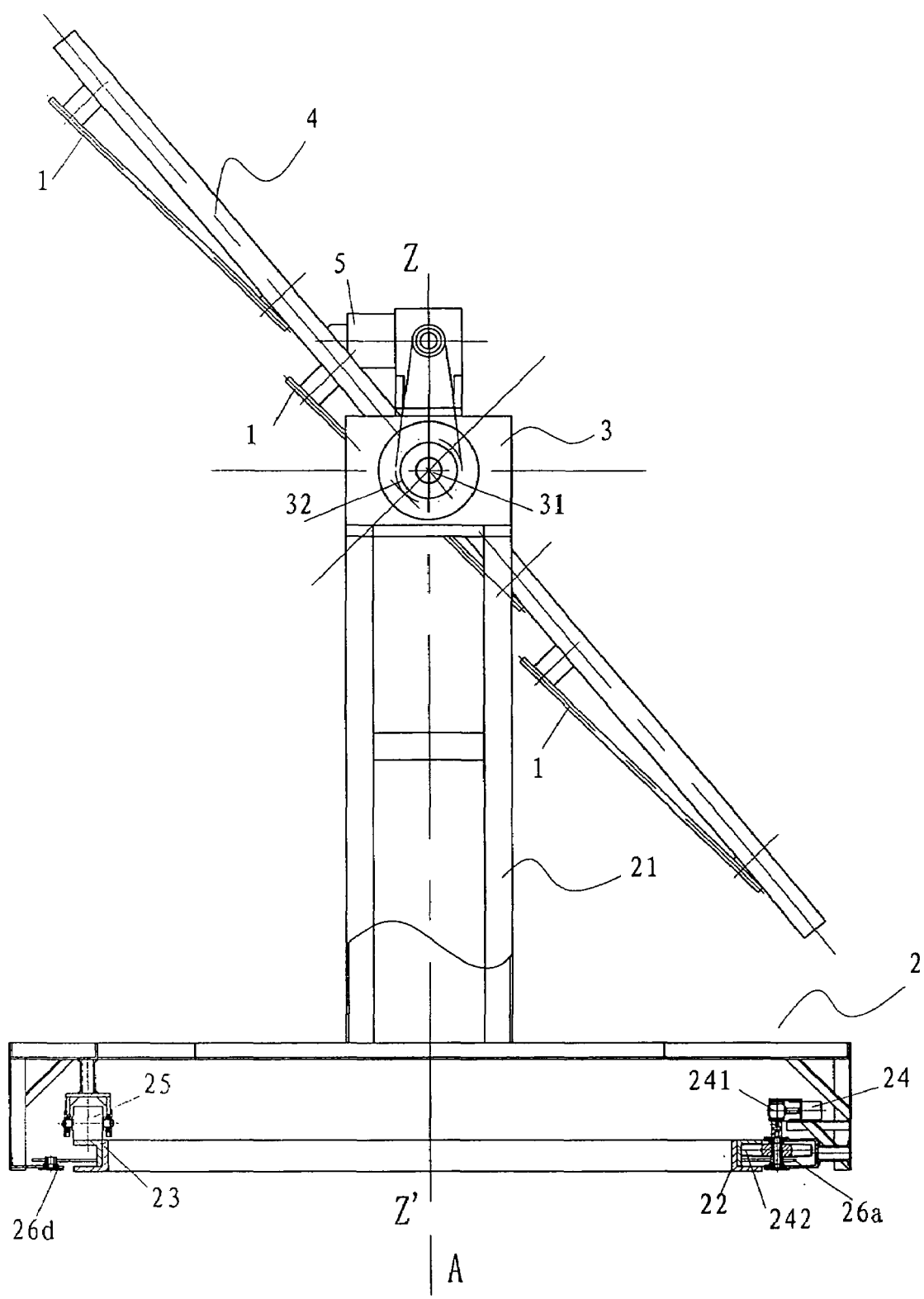
FIG. 12 is the structural diagram of still another embodiment of this invention.
Figure 13:
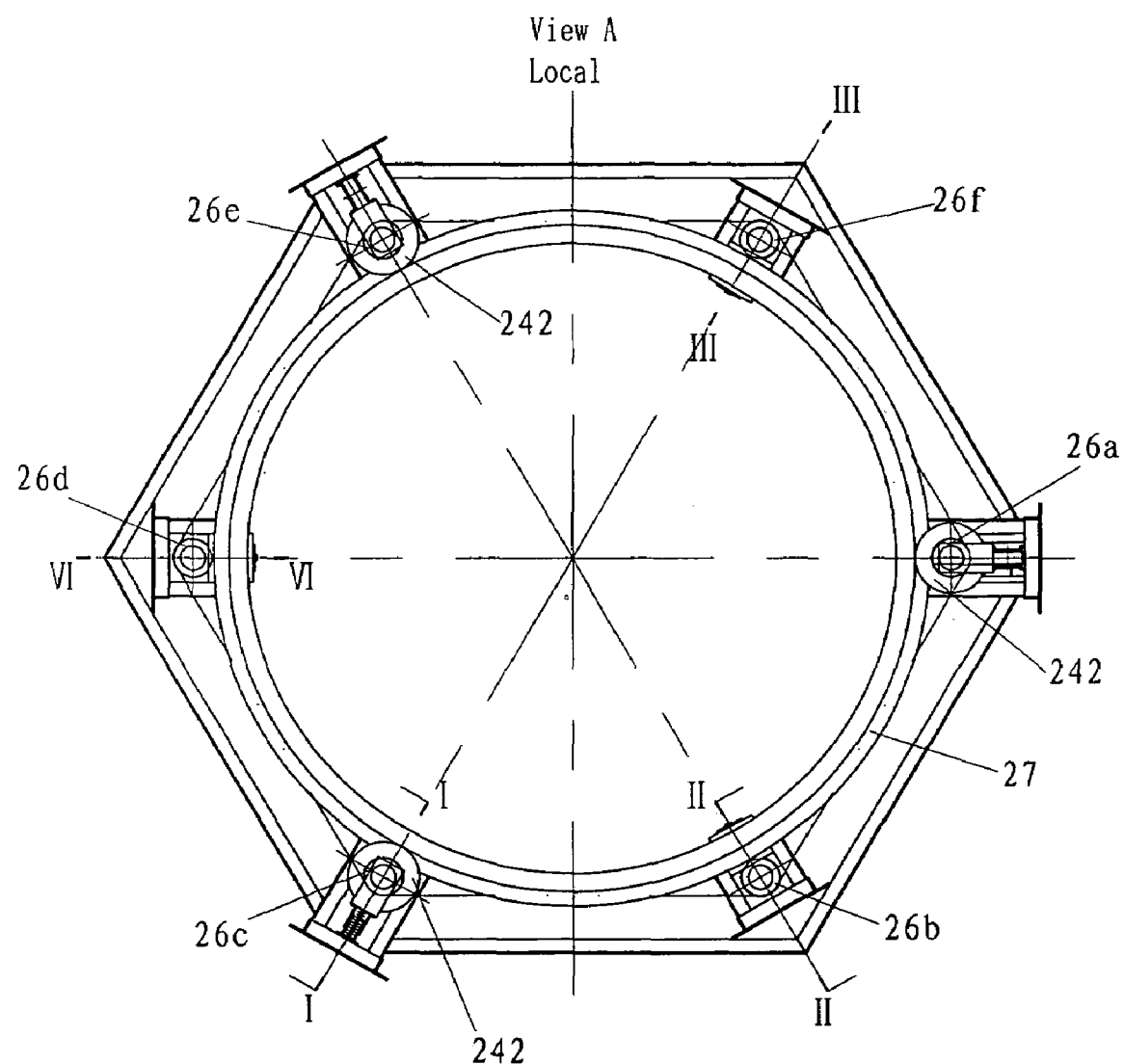
FIG. 13 is the A local view of FIG. 12.
Figure 14:
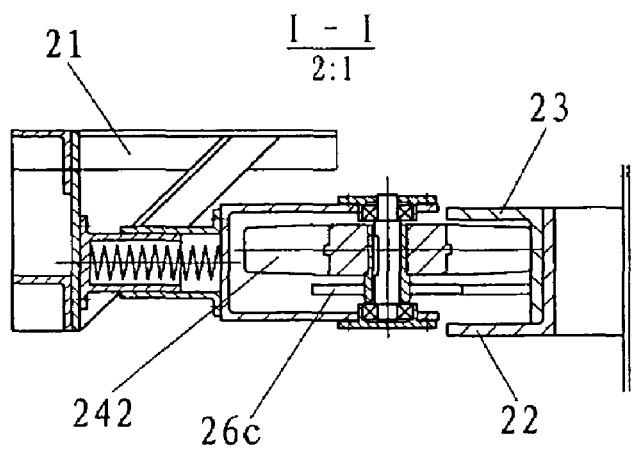
FIG. 14 is the I—I view of FIG. 13.
Figure 15:
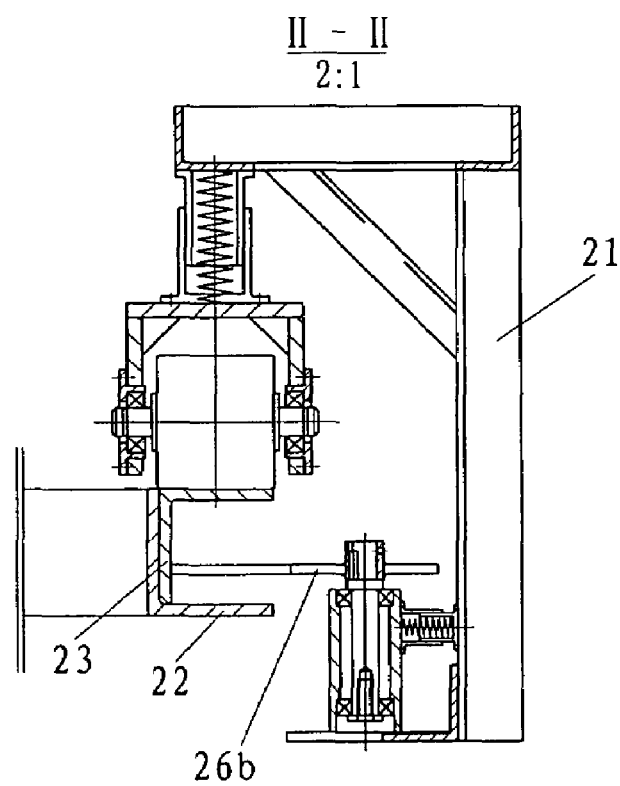
FIG. 15 is the II—II view of FIG. 13.

FIG. 12 illustrates yet another embodiment of invention. The main differences between this embodiment from the above embodiments are, first of all, the frame 4 in this embodiment is an integral rigid structure. The planar reflectors 1 are fixed in parallel on this frame 4 at a fixed spacing, the transversal main turning shaft 31 is in rigid connection with the frame 4, and the altitudinal angle adjusting mechanism 3 drives the transversal main turning shaft 31 to turn in a controlled manner to turn the integral rigid frame 4, thereby enabling the planar reflectors 1 to adjust their altitudinal angles in synchronization. Second, a mounting relations of the parts of the azimuth angle adjusting mechanism have been adjusted in another way, as shown in FIGS. 13, 14 and 15. As can be seen, the motor driving mechanism 24 is fixed on the extended lower part of the supports 21, instead of on the base 22. Accordingly, the rail 23 and the base 22 form a fixed integration. The friction wheels 242 contact the rail 23, and the motor driving mechanism 24 drives the supports 21 and its extending frame to rotate around the axial line ZZ' along the rail 23. One of the three friction wheels 242 or of the three supporting rollers 25 can be in a spring loaded structure for clearance adjustment to accommodate the irregularity of rail 23, as shown in FIGS. 14 and 15. This embodiment also has the effect as described for the above embodiments, except that it has no function for spacing adjustment, and therefore it is not described in detail here.

The functional difference of this embodiment from the above mentioned embodiments is that, the sunlight is not projected in the direction of the central axial line ZZ' of the circular rail. Rather, it is projected in a fixed direction other than the central axial line ZZ' of the circular rail.

To realize the function of this embodiment to project the sunlight in a fixed direction other than the central axial line ZZ' of the circular rail, in addition to satisfying the condition that the planar reflector altitudinal changing angle should be half of the sun altitudinal changing angle, appropriate changes should also be made to the planar reflector azimuth angle adjusting mechanism so that the azimuth changing angle of the frame rotating around the circular rail central axial line ZZ' of the azimuth angle adjusting mechanism, the planar reflectors on it and the supports for the frame should be half of the sun azimuth changing angle.

Figure 17:
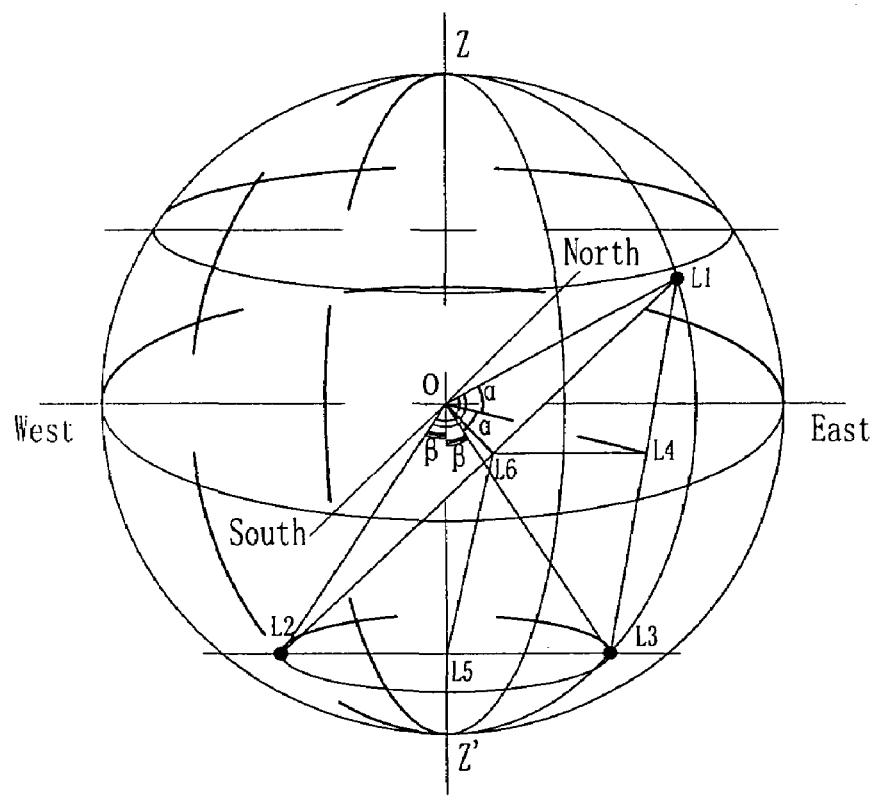
FIG. 17 is the schematic diagram of sunlight projection in a fixed direction other than the central axial line ZZ' of the circular rail in FIG. 16.

Referring to FIG. 17, the purpose is to have sunlight coming from point L1 finally projected to the point L2 below the true south via the planar reflectors at point O. In $\triangle OL1L2$, OL6 is a normal line. A corresponding point L3 may be taken with respect to point L2 on the same altitudinal line, and OL4 is the normal line in $\triangle OL1L3$ and OL5 is the normal line in $\triangle OL2L3$. At the beginning, the normal line of planar reflectors is directed to the sun L1, and the planar reflectors are turned by ½ of the altitudinal angle $\alpha$. With this, the sunlight is reflected to position OL3. On this basis, the planar reflectors continue to turn by ½ azimuth angle $\beta$ so that the sunlight is reflected to position OL2. In other words, with two actions respectively in altitudinal angle and azimuth angle, the sunlight can be reflected to the fixed position of L2.

Figure 16:
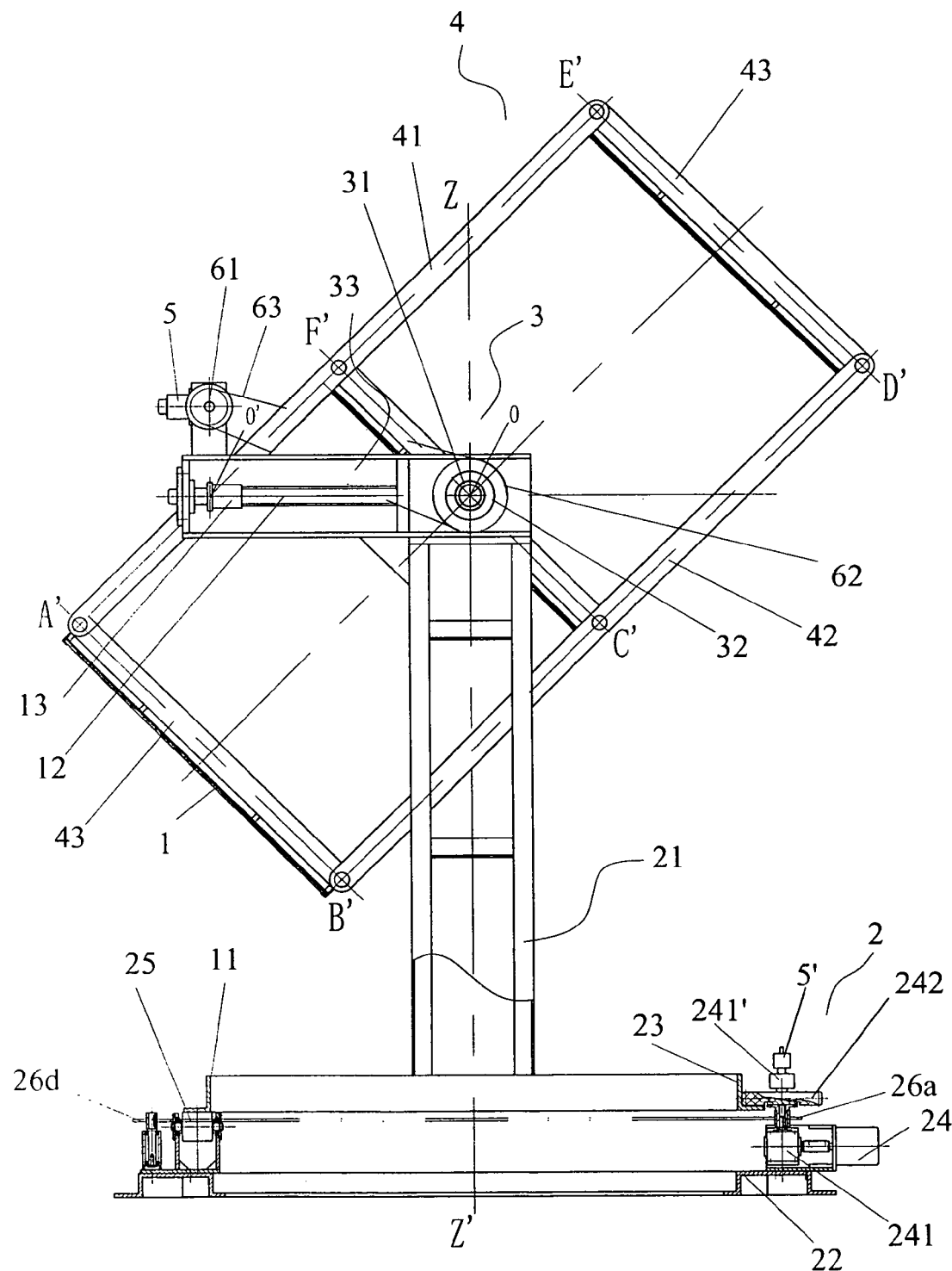
FIG. 16 is the structural diagram of yet another embodiment of this invention.

The specific structure to realize this is as shown in FIG. 16. At the end of the output shaft of the reducer 241 with rigid connection of friction wheel 242, another reducer 241' is connected. To make a distinction, this reducer 241' is referred to as ½ azimuth angle reducer. It can be a set of gears for reduction purpose, and its output shaft is in rigid connection with another sensor 5'. The belt driving mechanism comprises pulleys 61 and 62, and synchromesh gear belt 63 is actually also a reducer, which can be referred to as a ½ altitudinal angle reducer. It should be noted that, the portion for sensing the azimuth angle in the original sensor 5 has been separated out to form sensor 5', and sensor 5 only detects and senses altitudinal angle. With reasonable configuration of the reduction ratio of ½ azimuth angle reducer 241', the radius of rail 23 and friction wheels 242, finally the turning direction of rail 23 will agree with that of sensor 5', with the angular speed at half that of sensor 5'.

This arrangement provides another solution for the lighting in rooms on ground floors for two multi-level buildings located close together. It is only necessary to install the device on the roof of one building and select a proper initial position to project the reflected sunlight directly at an inclining angle into the window of the users on the ground floor of the other building. To ensure the accuracy of directed projection of sunlight and overcome errors, locating sensor comprising four sets of photosensitive elements can be arranged around this given projection area on the windows so that sunlight will not go beyond this given area.

Figure 18:
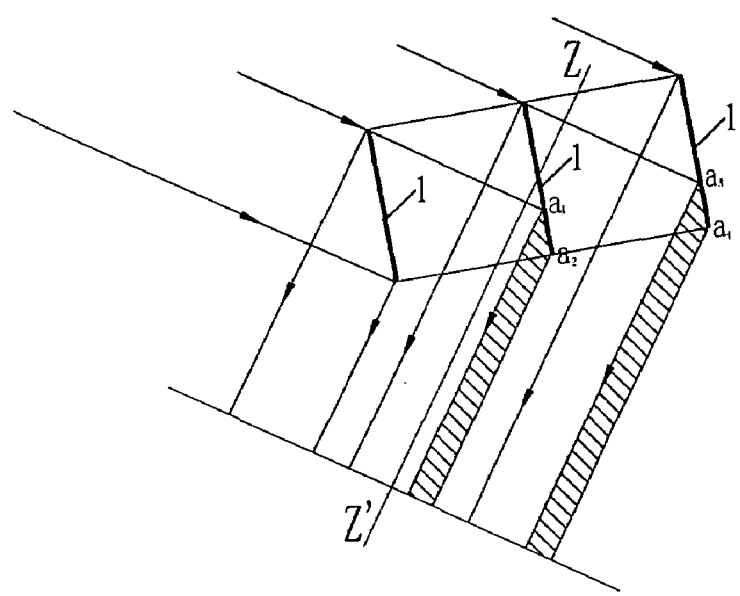
FIG. 18 is the schematic diagram showing that the incident light of rear planar reflectors is shaded when the circular rail is inclined.

When the given sunlight projecting direction is perpendicular to horizontal plane, there is no obstacle to the incident light of any of the planar reflectors and no overlapping or unlighted space between the projections of reflected light rays. It can be found that, when the given projection direction of sunlight is not perpendicular to the horizontal plane, or the central axial line ZZ' of the circular rail is inclined at a given angle with the horizontal plane, part of the incident light from the planar reflectors in the rear is perhaps shaded by the planar reflectors in front, as shown in FIG. 18. Because the circular rail is inclined, part of the two reflectors in the rear, $a_1a_2$ and $a_3a_4$ is shaded by the front reflector so the part of the rear reflector is not fully utilized. Further, more area will be shaded with the increase of the inclining angle. To solve this problem, reflectors are used in a ladder arrangement as shown in this embodiment.

Figure 19:
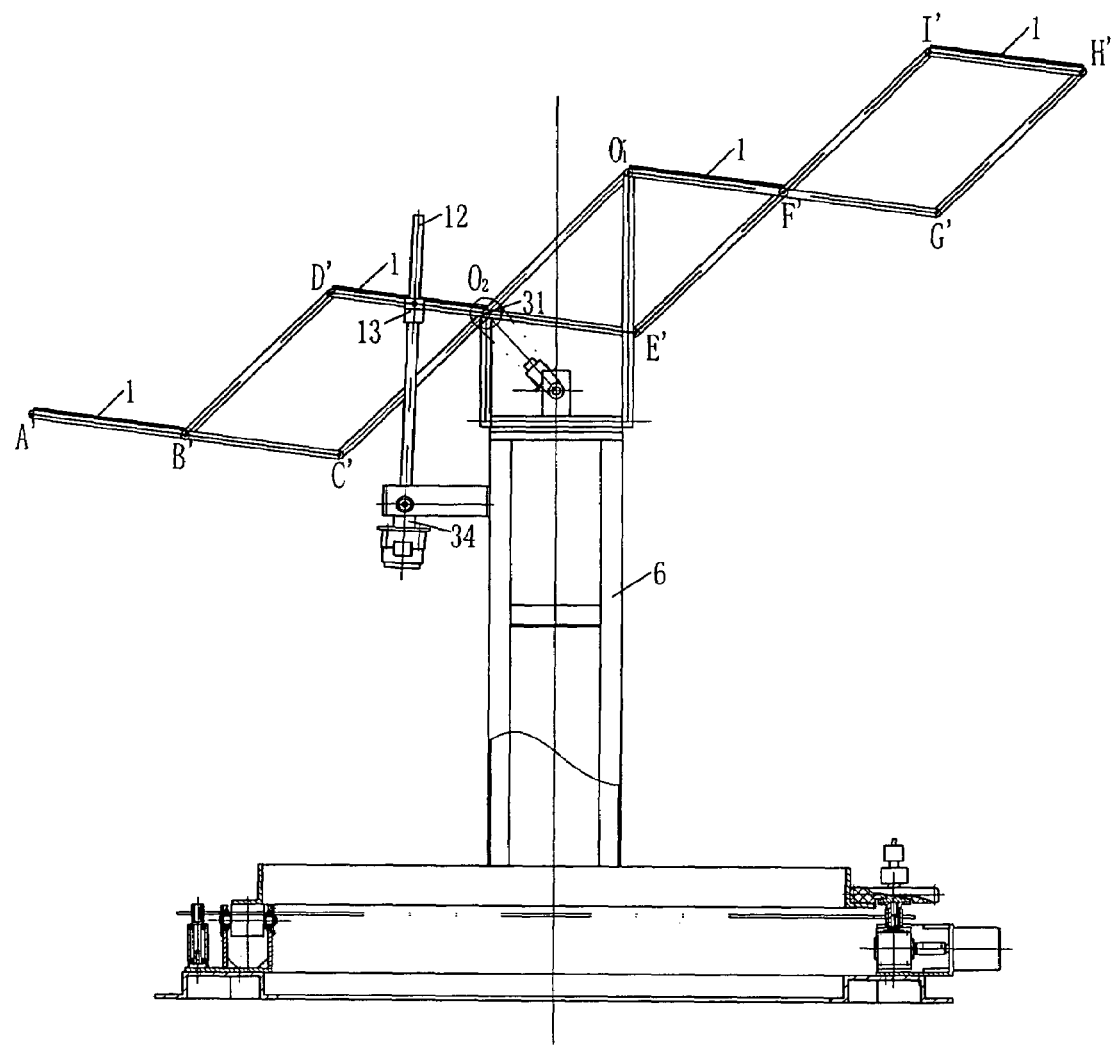
FIG. 19 is the structural schematic of still another embodiment of this invention.

As shown in FIG. 19, the altitudinal angle adjusting mechanism will function so that the change in planar reflector altitudinal angle is half of the change in sun altitudinal angle, and the azimuth angle adjusting mechanism will function so that the change in planar reflector azimuth angle is half of the change in sun azimuth angle.

One side of the frame is the parallel connecting rod mechanism A'B'C'D'O2O1E'F'G'H'I', in which one connecting rod O1O2C' is in rigid connection with the supports 6. The altitudinal angle adjusting mechanism includes at least the transversal main turning shaft 31 that is parallel with the planar reflectors. The transversal main turning shaft 31 is hinge supported on connecting rod O1O2C' and in rigid connection with connecting rod D'O2E'. The four planar reflectors are respectively fixed in parallel on all synchronously moving parallel connecting rods A'B', D'O2, O1F' and I'H', in a ladder arrangement, and the parallel connecting rod mechanism is rotatably supported on the supports 6 via the transversal main turning shaft 31. The altitudinal angle adjusting mechanism also includes the screw and nut mechanism, in which the nut 13 is hinge supported on connecting rod D'O2E', the screw 12 is hinge supported on supports 6 at one end via the looper 34, the motor output shaft is directly connected with screw 12, and the motor is in rigid connection with the looper 34. While a screw 12 is moving in the nut 13, connecting rod D'O2E' rotates around O2, and the angle between the adjacent connecting rods in parallel connecting rod mechanism changes to adjust the altitudinal angle of planar reflectors on the connecting rods.

Figure 20:
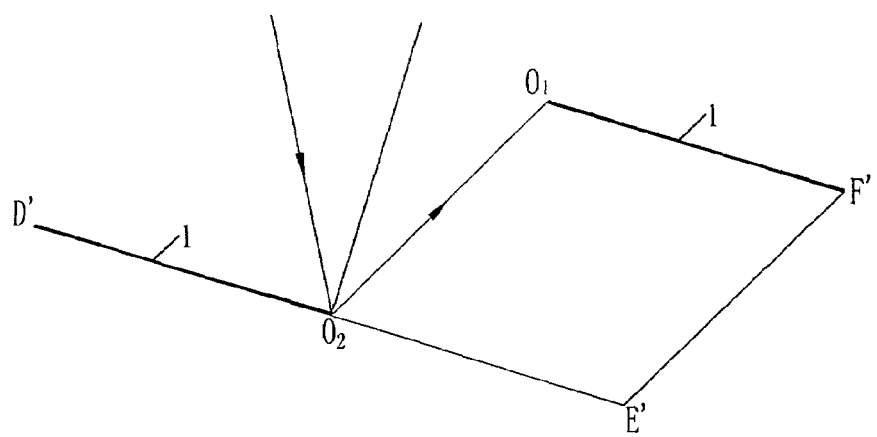
FIG. 20 is the principle diagram of projecting the sunlight in the set direction O2O1 in FIG. 19.

The moment when the light collecting device is in the true south of the projecting direction, the sun is also in the true south, and the azimuth angle deviation at this moment is defined as zero. When viewed from one side, part of the light collecting device is as shown in FIG. 20, D'O2E'F'O1 is the parallel connecting rod mechanism. The planar reflectors are fixed respectively on connecting rods D'O2 and O1F', connecting rod O1O2 is in rigid connection with supports 6 so that the position remains unchanged so that the reflected light from both reflectors is projected in the direction pointed by O1O2 without shading each other, and in no circumstance will the incident light from the rear reflector be shaded. When the sun changes position, as the parallel connecting rod mechanism is driven by the screw and nut mechanism, planar reflectors will rotate correspondingly with the transversal main turning shaft 31 of parallel connecting rod mechanism at point O2 to adjust their altitudinal angle and mutual spacing. In addition, their azimuth angle will be adjusted with the movement of the circular rail so that both the altitudinal angle and azimuth angle of planar reflectors will change just half of the altitudinal angle and azimuth angle of the sun, and the reflected light from both planar reflectors can project in the given direction.

To overcome the problem that the front reflector might shade the rear one slightly at a specific moment due to the rigid connection of connecting rod O1O2, further optimization can be made on the basis of this embodiment, such as by changing the angle of connecting rod O1O2 alone using another connecting rod mechanism or a screw-nut mechanism to eventually realize projection of reflected light rays free of overlapping or unlighted space.

Similarly to ensure the projection accuracy of sunlight in the given direction with minimized error, a positioning sensor comprising four photosensitive elements can be fit at certain position in the given direction of sunlight projection so that the sunlight will be kept in the given direction at all times.

Of course, the azimuth angle adjusting mechanism in this embodiment is not necessarily located on the side of the circular rail. The support can also be rotated by a circular rack and gear mechanism with central axial line ZZ'.

There are still some other embodiments of this invention in addition to the above embodiments. For instance: (1) the driving mechanism of the parallel connecting rod mechanism is a gear-rack reciprocating linear moving mechanism instead of a screw-nut mechanism; (2) the screw-nut driving mechanism as a reciprocating linear moving mechanism in which the nut rotates with the screw moving forward and backward instead of the screw rotating with the nut moving forward and backward; (3) the parallel connecting rod mechanisms on both sides remaining unchanged, but only one set of reciprocating linear moving mechanisms is adopted to drive the parallel connecting rod mechanism on one side, with the opposite side operating in a passive manner; (4) the screw-nut driving mechanism as reciprocating linear moving mechanism being that with motor directly driving the screw, instead of connection with transversal main turning shaft via the conical gear pair; (5) other variants of parallel connecting rod mechanisms can be used; (6) the vertical positions of parallel connecting rod mechanisms, rails and bases in the embodiment being arranged in an inverted order, i.e., the parallel connecting rod mechanism being suspended on the rail or base via the supports.

Any equivalent substitution or similar combination conversion on the basis of this invention by technical personnel in this field shall be within the protection range of this invention.

What is claimed is:

1. A directed reflection light collecting device with planar reflectors, comprising two or more planar reflectors, an azimuth angle adjusting mechanism and an altitudinal angle adjusting mechanism, the azimuth angle adjusting mechanism including a base, supports, a circular rail with a central axial line and a driving mechanism, wherein the two or more planar reflectors are arranged in mutual parallel on a frame, the altitudinal angle adjusting mechanism including at least one transversal main turning shaft parallel with the planar reflectors, the frame being rotatably supported via this transversal main turning shaft on the supports of the azimuth angle adjusting mechanism, the altitudinal angle adjusting mechanism driving this frame in a controlled manner to move the planar reflectors, wherein an altitudinal changing angle of the planar reflectors is half of a sun altitudinal changing angle, the frame comprising two identical parallel connecting-rod mechanisms, respectively, on both sides of the planar reflectors, each connecting-rod mechanism comprising at least two parallel connecting rods in a length direction and two parallel connecting rods in a height direction pivotally connected between the two connecting rods in the length direction, the two connecting-rod mechanisms being pivoted therebetween by parallel pivoting rods, each of the planar reflectors being fixed on at least one pivoting rod to adjust the altitudinal angle of the planar reflectors and their mutual spacing with a movement of the parallel connecting-rod mechanisms, the planar reflectors having a rectangular shape, wherein connecting lines of four apexes of every two adjacent planar reflectors on a same side form a rhombus in which one of the diagonal lines of the rhombus is always parallel with the central axial line of the circular rail.

2. A directed reflection light collecting device with planar reflectors according to claim 1, wherein the altitudinal angle adjusting mechanism comprises a reciprocating linear moving mechanism and the transversal main turning shaft, the reciprocating linear moving mechanism being connected to one of the connecting rods of the parallel connecting-rod mechanism via its moving part, a moving line of this part being parallel with one diagonal line of the rhombus, a linear movement of the moving part of the reciprocating linear moving mechanism pushing the movement of the parallel connecting-rod mechanism to adjust the altitudinal angle and spacing of the planar reflectors.

3. A directed reflection light collecting device with planar reflectors according to claim 2, wherein the reciprocating linear moving mechanism includes a screw and a nut connected with the screw, the nut being hinge supported on the connecting rod via a pin, and the screw being connected with an output shaft of the altitudinal angle adjusting mechanism, a rotation of this output shaft turning the screw and further moving the nut connected with it to drive the parallel connecting-rod mechanism via the pin.

4. A directed reflection light collecting device with planar reflectors according to claim 1, wherein the transversal main turning shaft of the altitudinal angle adjusting mechanism is in rigid connection with one of the connecting rods of the parallel connecting-rod mechanism, a straight line passing a connection point of this rigid connection and parallel with one diagonal line of the rhombus intersects an adjacent connecting rod at an intersecting point, where a sliding block or pulley is provided and can slide along a straight sliding trough mounted between the connection point of the rigid connection and the intersecting point, the transversal main turning shaft being connected with a driving motor, including a reducer, of the altitudinal angle adjusting mechanism at one end.

5. A directed reflection light collecting device with planar reflectors according to claim 1, wherein the driving mechanism drives the supports and brings the planar reflectors on the frame to rotate around the central axial line of the circular rail to adjust its azimuth angle, an azimuth changing angle of which being equal to a sun azimuth changing angle, thereby realizing directed projection of sunlight in a direction of the central axial line of the circular rail.

6. A directed reflection light collecting device with planar reflectors according to claim 5, wherein the driving mechanism comprises a motor, including a reducer, and friction wheels connected at an output end of the motor, the driving mechanism being fixed on a supports bottom, and the rail being in rigid integration with the base, the friction wheels being in contact with the rail to drive the supports to rotate around the central axial line along the rail.

7. A directed reflection light collecting device with planar reflectors according to claim 5, wherein the driving mechanism comprises a motor, including a reducer, and friction wheels connected at an output end of the motor, the driving mechanism being fixed on the base, the rail being in rigid connection with the supports and rotatably supported on the base via rollers or balls fixed on the base, the friction wheels being in contact with the rail to drive the rail itself together with the supports to rotate around the central axial line.

8. A directed reflection light collecting device with planar reflectors according to claim 1, wherein the collecting device can also include a sensor to monitor a sun position and a processing circuit, an output signal from the sensor being output to the processing circuit to control the altitudinal angle and azimuth angle adjusting mechanisms.

9. A directed reflection light collecting device with planar reflectors according to claim 8, wherein the sensor to monitor the sun position is comprised of a light shading post, photosensitive elements arranged in four directions around the post, and a base for burying the photosensitive elements at a certain depth, wherein for each photosensitive element, a reflection shading block is arranged to shade $1/6$–$1/2$ of a receiving window close to a light shading post side wall.

10. A directed reflection light collecting device with planar reflectors according to claim 1, wherein the planar reflectors can be glass mirrors, or flat plates with high-efficiency light reflecting films applied onto their surfaces.

* * * * *